United States Patent
Kamotsky

(10) Patent No.: US 11,392,593 B2
(45) Date of Patent: Jul. 19, 2022

(54) SYSTEMS AND METHODS FOR CALCULATING RECOMMENDATION SCORES BASED ON COMBINED SIGNALS FROM MULTIPLE RECOMMENDATION SYSTEMS

(71) Applicant: Macy's IP Holdings, LLC, Cincinnati, OH (US)

(72) Inventor: Denis Kamotsky, Santa Fe, NM (US)

(73) Assignee: MACY'S IP HOLDINGS, LLC, Cincinnati, OH (US)

( * ) Notice: Subject to any disclaimer, the term of this patent is extended or adjusted under 35 U.S.C. 154(b) by 241 days.

(21) Appl. No.: 16/744,487

(22) Filed: Jan. 16, 2020

(65) Prior Publication Data
US 2020/0233873 A1 Jul. 23, 2020

Related U.S. Application Data

(60) Provisional application No. 62/794,060, filed on Jan. 18, 2019.

(51) Int. Cl.
*G06F 16/2457* (2019.01)
*G06Q 30/06* (2012.01)
*G06N 20/00* (2019.01)
*G06F 16/9535* (2019.01)

(52) U.S. Cl.
CPC .... *G06F 16/24578* (2019.01); *G06F 16/9535* (2019.01); *G06N 20/00* (2019.01); *G06Q 30/0625* (2013.01); *G06Q 30/0631* (2013.01)

(58) Field of Classification Search
CPC ......... G06F 16/24578; G06F 16/9535; G06Q 30/0631; G06Q 30/0625; G06N 20/00
See application file for complete search history.

(56) References Cited

U.S. PATENT DOCUMENTS

2021/0209134 A1* 7/2021 Kenedy ............... G06F 16/2237

* cited by examiner

*Primary Examiner* — Etienne P Leroux
(74) *Attorney, Agent, or Firm* — Amster, Rothstein & Ebenstein LLP

(57) ABSTRACT

System and method for providing, in response to *a* search query, product recommendations based at least in part *on a* blend of recommendation signals from multiple product recommendation systems.

30 Claims, 4 Drawing Sheets

SYSTEMS AND METHODS FOR CALCULATING RECOMMENDATION SCORES BASED ON COMBINED SIGNALS FROM MULTIPLE RECOMMENDATION SYSTEMS

CROSS-REFERENCE TO RELATED APPLICATION

The present application claims the benefit of and priority to U.S. Provisional Patent Application No. 62/794,060, filed on Jan. 18, 2019, the entire contents of which are incorporated by reference herein

FIELD OF INVENTION

The present invention generally relates to systems and methods for responding to search queries. More particularly, the present invention relates to systems and methods for responding to search queries relating to products by calculating product recommendation scores based on combined signals from multiple recommendation systems.

SUMMARY OF THE INVENTION

Systems and methods for calculating recommendation scores based on combined signals from multiple recommendation systems are provided.

More particularly, the present invention relates to a computer implemented method comprising the steps of (a) receiving, at a computer system comprising one or more computers, a search query containing a search phrase from a user device; (b) executing, by the computer system, a query on a search index database to identify matches in response to the search query; (c) computing, by the computer system, facet counts associated with the matches; (d) ranking, by the computer system, the matches; (e) selecting, by the computer system, top K of the matches, wherein K is a predetermined number; (f) receiving, at the computer system from a plurality of recommendation systems, a plurality of recommendation signals generated by the plurality of recommendation systems based at least in part on the search phrase, the top K of the matches and the facet counts; (g) calculating, by the computer system, recommendation scores based at least in part on a combination of the plurality of recommendation signals from the plurality of recommendation systems in accordance with a scoring function $S[p, 1]$:

$$S[p,1]=B_\in[p,1]\times((P|M)_\in[p,n]\cdot U[n,r_a]\cdot \boldsymbol{W_a}\,[\boldsymbol{\tilde{r}_a}\,1]),$$

wherein $B[p,1]=\hat{Q}[p,\tilde{r}_p]\cdot\tilde{W}_t[\tilde{r}_p,1]$ is a multiplicative boost vector, $U[n,r_a]=((R\times L\,|M)_\in[n,\tilde{r}_p]\times L[n,1]$ is an adjusted attribute value recommendation matrix, L is whitelisting and blacklisting of attributes and attribute values, P is a product matrix $P[p, n]$ of p products, each product having a total of n possible one-hot encoded attribute values, M is a matrix $M[a, n]$ of one-hot encoded attribute-value to attribute assignments, Q is a first recommendation signal $Q[q, r_p]$ from $r_p$ product recommenders, R is a second recommendation signal $R[n, r_a]$ from $r_a$ attribute- and attribute-value recommenders, $W_p$ is a vector $W_p[r_p, 1]$ of product recommender weights, $W_a$ is a vector $W_a[r_a, 1]$ of attribute- and attribute-value recommender weights, and the recommendation signals comprise the first recommendation signal $Q[q, r_p]$ and the second recommendation signal $R[n, r_a]$; (h) determining, by the computer system, an order of the top K of the matches based at least in part on the recommendation scores; (i) determining, by the computer system, an order of facets and facet values based at least in part on the recommendation scores; (j) generating, by the computer system, a search result comprising the ordered top K of the matches and the ordered facets and facet values; and (k) providing, by the computer system, the search result to the user device.

In at least one embodiment, the computer implemented method further comprises, after the step (g) and before the step (h), the step of selecting at most k from the top K of the matches that contribute at least s % of a total of the recommendation scores, wherein the s % is a predetermined percentage of the total of the recommendation scores and $k \leq K$.

In at least one embodiment, the computer implemented method further comprises, after the step (g) and before the step (i), the step of selecting facet values that contribute at least a predetermined percentage of the total of the recommendation scores per facet.

In at least one embodiment, the step (g) of calculating recommendation scores comprises approximating, by the computer system using a machine learning model, a quadratic function $S[p, 1]=(\phi[p, r]\cdot W_p[r, 1])\times(\phi[p, r]\cdot W_a[r,1])$ to learn the product recommender weights $W_p$ and the attribute- and attribute-value recommender weights $W_a$ based at least in part on key-performance-indicator driving feedback signals, wherein:

$$\phi_p[p,r_p]=\hat{Q}_\in[p,\tilde{r}_p];$$

$$\phi_{a1}[p,r_a]=(P|M)_\in[p,n]\cdot U[n,r_a];$$

$$\phi_{a1}[p,r]=\phi_p[p,r_p]\cup\phi_{a1}[p,r_a], \text{ where } r=r_p+r_a,$$

and a log associated with $\phi$ is used as an input into training of the machine learning model.

In at least one embodiment, the step (g) of calculating recommendation scores comprises directly approximating, by the computer system using a first machine learning model, product feature weights $W[\tilde{r}, 1]$ wherein:

$$S(\phi)[p,1]=\Phi[p,\tilde{r}]\cdot W[\tilde{r},1]$$

$$W[\tilde{r},1]=(\Phi^T[\tilde{r},p_t]\cdot\Phi[p_t,\tilde{r}]+\alpha I[\tilde{r},\tilde{r}])^{-1}\cdot\Phi^T[\tilde{r},p_t]\cdot S[p_t,1],$$

$\tilde{r}$ is a number of transformed features from r input features, and transformed features $\Phi[p, \tilde{r}]$ of a log associated with $\phi[p, r]$ are used as input into training of the first machine learning model.

In at least one embodiment, the transformed features $\Phi[p, \tilde{r}]$ are obtained by:

$$\bigcup_{k=1}^{p} \phi(k)\otimes\phi(k)$$

In at least one embodiment, the step (g) of calculating recommendation scores comprises approximating, by the computer system using a first machine learning model, a linear function $\mathcal{F}_{a2}$ to learn attribute-and-attribute value weights $W_a$ wherein:

$$\mathcal{F}_{a2}(P,M,R,W_a)[n,1]=U[n,r_a]\cdot\boldsymbol{W_a}\,[\boldsymbol{\tilde{r}_a},1]$$

$$\phi_{a2}[n,r_a]=U[n,r_a]$$

a log associated with $\phi_{a2}$ is used as an input into training of the first machine learning model.

In at least one embodiment, the first machine learning model comprises a pointwise training discipline using a linear model.

In at least one embodiment, the step (g) of calculating recommendation scores further comprises approximating, by the computer system using a second machine learning model, a feature transformation function $$\Phi[p,r_p] = \phi_p[p,r_p] \times ((P|M)_\in[p,n] \cdot \mathcal{F}_{a2}(\phi_{a2}[p,r_a])[n,1])$$

to learn the product recommender weights $W_p$, wherein:

$$S[p,1] = \Phi[p,r_p] \cdot W_p[r_p,1]; \text{ and}$$

$$\phi_p[p,r_p] = \hat{Q}_\in[p, \hat{r}_p].$$

In at least one embodiment, the second machine learning model comprises a pointwise training discipline using a linear model.

In at least one embodiment, wherein the step (g) of calculating recommendation scores comprises computing, by the computer system, a vector of attribute value scores $V[n, 1]$ in accordance with:

$$V[n,1] = U[n,r_a] \cdot W_a[\hat{r}_a, 1].$$

In at least one embodiment, the step (g) of calculating recommendation scores further comprises computing, by the computer system, attribute scores $\mathcal{A}(V)$ by summing each block in accordance with:

$$\mathcal{A}(V) = A[a,1] = M[a,n] \cdot V[n,1].$$

In at least one embodiment, the step (i) of determining an order of facets and facet values comprises generating, by the computer system, a vector of cumulative attribute value ranks $I[n, 1]$ in accordance with:

$$I[n, 1] = \text{hi\_sort}\left(V[n, 1] \times \sum_p ((P \mid M)_\epsilon[p, n] \times B_\epsilon[p, 1])^T[n, p], M[a, n], DESC\right).$$

In at least one embodiment, the step (i) of determining an order of facets and facet values comprises generating, by the computer system, a vector of discriminative attribute value ranks $I[n, 1]$ in accordance with:

$$I[n,1] = \text{hi\_sort}(V[n,1] \times (1+\varepsilon - \Delta G^T)[n,1], M[a,n], DESC),$$

wherein $\varepsilon[n, 1]$ is a vector having a very small value $\varepsilon$ for each element to facilitate a tie-break, $$(G_1[1, n] - G_2[1, n]) \cdot V[n, 1] =$$

$$\Delta G[1, n] \cdot V[n, 1] = \sum_{i=1}^{n} (G_1(i) - G_2(i)) * V(i).$$

$$G_1[1, n] = \left(\sum_{p_1} \mathcal{F}_{p_1}[p_1, 1]\right)[1, 1] \times \left(\sum_{p_1} (P \mid M)_{\epsilon_1}[p_1, n]\right)[1, n]$$

$$G_2[1, n] = \left(\sum_{p_2} \mathcal{F}_{p_2}[p_2, 1]\right)[1, 1] \times \left(\sum_{p_2} (P \mid M)_{\epsilon_2}[p_2, n]\right)[1, n]$$

$$\Delta G_1[1, n] =$$

$$\left(\sum_{p_1} B_\epsilon\right)[1, 1] \times \left(\sum_{p_1} (P \mid M)_\epsilon\right)[1, n] - \left(\sum_{p_2} B_\epsilon\right)[1, 1] \times \left(\sum_{p_2} (P \mid M)_\epsilon\right)[1, n]$$

and wherein $G_1$ and $G_2$ are group vectors for a first group of products $p_1$ and a second group of products $p_2$, respectively, the first group of products $p_1$ and the second group of products $p_2$ being selected from the p products based on their recommendation scores in S[p, 1].

In addition, the present invention also relates to a computer system comprising one or more memories comprising a search index database; one or more processors operatively connected to the one or more memories; and one or more computer readable media operatively connected to the one or more processors and having stored thereon computer instructions for carrying out the steps of (a) receiving, at the computer system, a search query containing a search phrase from a user device; (b) executing, by the computer system, a query on a search index database to identify matches in response to the search query; (c) computing, by the computer system, facet counts associated with the matches; (d) ranking, by the computer system, the matches; (e) selecting, by the computer system, top K of the matches, wherein K is a predetermined number; (f) receiving, at the computer system from a plurality of recommendation systems, a plurality of recommendation signals generated by the plurality of recommendation systems based at least in part on the search phrase, a customer record, the top K of the matches and the facet counts; (g) calculating, by the computer system, recommendation scores based at least in part on a combination of the plurality of recommendation signals from the plurality of recommendation systems in accordance with a scoring function S[p, 1]:

$$S[p,1] = B_\in[p,1] \times ((P|M)_\in[p,n] \cdot U[n,r_a] \cdot W_a[\hat{r}_a 1]).$$

wherein $B[p, 1] = \hat{Q}[p, \hat{r}_p] \cdot \mathcal{W}_{\hat{r}_p}[\hat{r}_p, 1]$ is a multiplicative boost vector, $U[n,r_a] = ((R \times L \mid M)_\in[n, \hat{r}_p] \times L[n,1]$ is an adjusted attribute value recommendation matrix, L is whitelisting and blacklisting of attributes and attribute values, P is a product matrix P[p, n] of p products, each product having a total of n possible one-hot encoded attribute values, M is a matrix M[a, n] of one-hot encoded attribute-value to attribute assignments, Q is a first recommendation signal $Q[q, r_p]$ from $r_p$ product recommenders, R is a second recommendation signal $R[n, r_a]$ from $r_a$ attribute- and attribute-value recommenders, $W_p$ is a vector $W_p[r_p, 1]$ of product recommender weights, $W_a$ is a vector $W_a[r_a, 1]$ of attribute- and attribute-value recommender weights, and the recommendation signals comprise the first recommendation signal $Q[q, r_p]$ and the second recommendation signal $R[n, r_a]$; (h) determining, by the computer system, an order of the top K of the matches based at least in part on the recommendation scores; (i) determining, by the computer system, an order of facets and facet values based at least in part on the recommendation scores; (j) generating, by the computer system, a search result comprising the ordered top K of the matches and the ordered facets and facet values; and (k) providing, by the computer system, the search result to the user device.

In at least one embodiment, the computer instructions further carry out, after the step (g) and before the step (h), the step of selecting at most k from the top K of the matches that contribute at least s % of a total of the recommendation scores, wherein the s % is a predetermined percentage of the total of the recommendation scores and k≤K.

In at least one embodiment, the computer instructions further carry out, after the step (g) and before the step (i), the step of selecting facet values that contribute at least a predetermined percentage of the total of the recommendation scores per facet.

In at least one embodiment, the step (g) of calculating recommendation scores comprises approximating, by the computer system using a machine learning model, a quadratic function $S[p, 1]=(\phi[p, r] \cdot W_p[r, 1]) \times (\phi[p, r] \cdot W_a[r, 1])$ to learn the product recommender weights $W_p$ and the attribute- and attribute-value recommender weights $W_a$ based at least in part on key-performance-indicator driving feedback signals, wherein:

$$\phi_p[p, r_p] = \hat{Q}_{\in [p, \hat{r}_p]};$$

$$\phi_{a1}[p, r_a] = (P|M)_{\in [p, n]} \cdot U[n, r_a];$$

$$\phi[p, r] = \phi_p[p, r_p] \cup \phi_{a1}[p, r_a], \text{ where } r = r_p + r_a;$$

and a log associated with $\phi$ is used as an input into training of the machine learning model.

In at least one embodiment, the step (g) of calculating recommendation scores comprises directly approximating, by the computer system using a first machine learning model, product feature weights $W[\tilde{r}, 1]$ wherein:

$$S(\phi)[p,1] = \Phi[p,\tilde{r}] \cdot W[\tilde{r},1]$$

$$W[\tilde{r},1] = (\Phi^T[\tilde{r},p_d] \cdot \Phi[p_d,\tilde{r}] + \alpha I[\tilde{r},\tilde{r}])^{-1} \cdot \Phi^T[\tilde{r},p_d] \cdot S[p_d,1],$$

and transformed features $\Phi[p, \tilde{r}]$ of a log associated with $\phi[p, r]$ are used as input into training of the first machine learning model.

In at least one embodiment, the transformed features $\Phi[p, \tilde{r}]$ are obtained by:

$$\bigcup_{k=1}^{p} \phi(k) \otimes \phi(k)$$

In at least one embodiment, the step (g) of calculating recommendation scores comprises approximating, by the computer system using a first machine learning model, a linear function $\mathcal{F}_{a2}$ to learn attribute-and-attribute value weights $W_a$ wherein:

$$\mathcal{F}_{a2}(P, M, R, W_a)[n,1] = U[n, r_a] \cdot W_a[\tilde{r}_a, 1]$$

$$\phi_{a2}[n, r_a] = U[n, r_a]$$

a log associated with $\phi_{a2}$ is used as an input into training of the first machine learning model.

In at least one embodiment, the first machine learning model comprises a pointwise training discipline using a linear model.

In at least one embodiment, the step (g) of calculating recommendation scores further comprises approximating, by the computer system using a second machine learning model, a feature transformation function $$\Phi[p, r_p] = \phi_p[p, r_p] \times ((P|M)_{\in [p, n]} \cdot \mathcal{F}_{a2}(\phi_{a2}[p, r_a])[n, 1])$$

to learn the product recommender weights $W_p$, wherein:

$$S[p, 1] = \Phi[p, r_p] \cdot W_p[r_p, 1]; \text{ and}$$

$$\phi_p[p, r_p] = \hat{Q}_{\in [p, \hat{r}_p]}.$$

In at least one embodiment, the second machine learning model comprises a pointwise training discipline using a linear model.

In at least one embodiment, the step (g) of calculating recommendation scores comprises computing, by the computer system, a vector of attribute value scores $V[n, 1]$ in accordance with:

$$V[n,1] = U[n, r_a] \cdot W_a[\tilde{r}_a, 1].$$

In at least one embodiment, the step (g) of calculating recommendation scores further comprises computing, by the computer system, attribute scores $\mathcal{A}(V)$ by summing each block in accordance with:

$$\mathcal{A}(V) = A[a,1] = M[a,n] \cdot V[n,1].$$

In at least one embodiment, the step (i) of determining an order of facets and facet values comprises generating, by the computer system, a vector of cumulative attribute value ranks $I[n, 1]$ in accordance with:

$$I[n, 1] = \text{hi\_sort}\left(V[n, 1] \times \sum_{p_1} ((P|M)_\epsilon [p, n] \times B_\epsilon[p, 1])^T[n, p], M[a, n], DESC\right).$$

In at least one embodiment, the step (i) of determining an order of facets and facet values comprises generating, by the computer system, a vector of discriminative attribute value ranks $I[n, 1]$ in accordance with:

$$I[n,1] = \text{hi\_sort}(V[n,1] \times (1 + \varepsilon - \Delta G^T)[n,1], M[a,n], DESC),$$

wherein $\varepsilon[n, 1]$ is a vector having a very small value for each element to facilitate a tie-break, $$(G_1[1, n] - G_2[1, n]) \cdot V[n, 1] =$$

$$\Delta G[1, n] \cdot V[n, 1] = \sum_{i=1}^{n} (G_1(i) - G_2(i)) * V(i),$$

$$G_1[1, n] = \left(\sum_{p_1} \mathcal{F}_{p_1}[p_1, 1]\right)[1, 1] \times \left(\sum_{p_1} (P|M)_{\epsilon_1}[p_1, n]\right)[1, n]$$

$$G_2[1, n] = \left(\sum_{p_2} \mathcal{F}_{p_2}[p_2, 1]\right)[1, 1] \times \left(\sum_{p_2} (P|M)_{\epsilon_2}[p_2, n]\right)[1, n]$$

$$\Delta G_1[1, n] =$$

$$\left(\sum_{p_1} B_\epsilon\right)[1, 1] \times \left(\sum_{p_1} (P|M)_\epsilon\right)[1, n] - \left(\sum_{p_2} B_\epsilon\right)[1, 1] \times \left(\sum_{p_2} (P|M)_\epsilon\right)[1, n]$$

and wherein $G_1$ and $G_2$ are group vectors for a first group of products $p_1$ and a second group of products $p_2$, respectively, the first group of products $p_1$ and the second group of products $p_2$ being selected from the p products based on their recommendation scores in $S[p, 1]$.

BRIEF DESCRIPTION OF THE DRAWINGS

Exemplary embodiments of the present invention will be described with references to the accompanying figures, wherein.

DETAILED DESCRIPTION OF PREFERRED EMBODIMENTS

Figure 1:
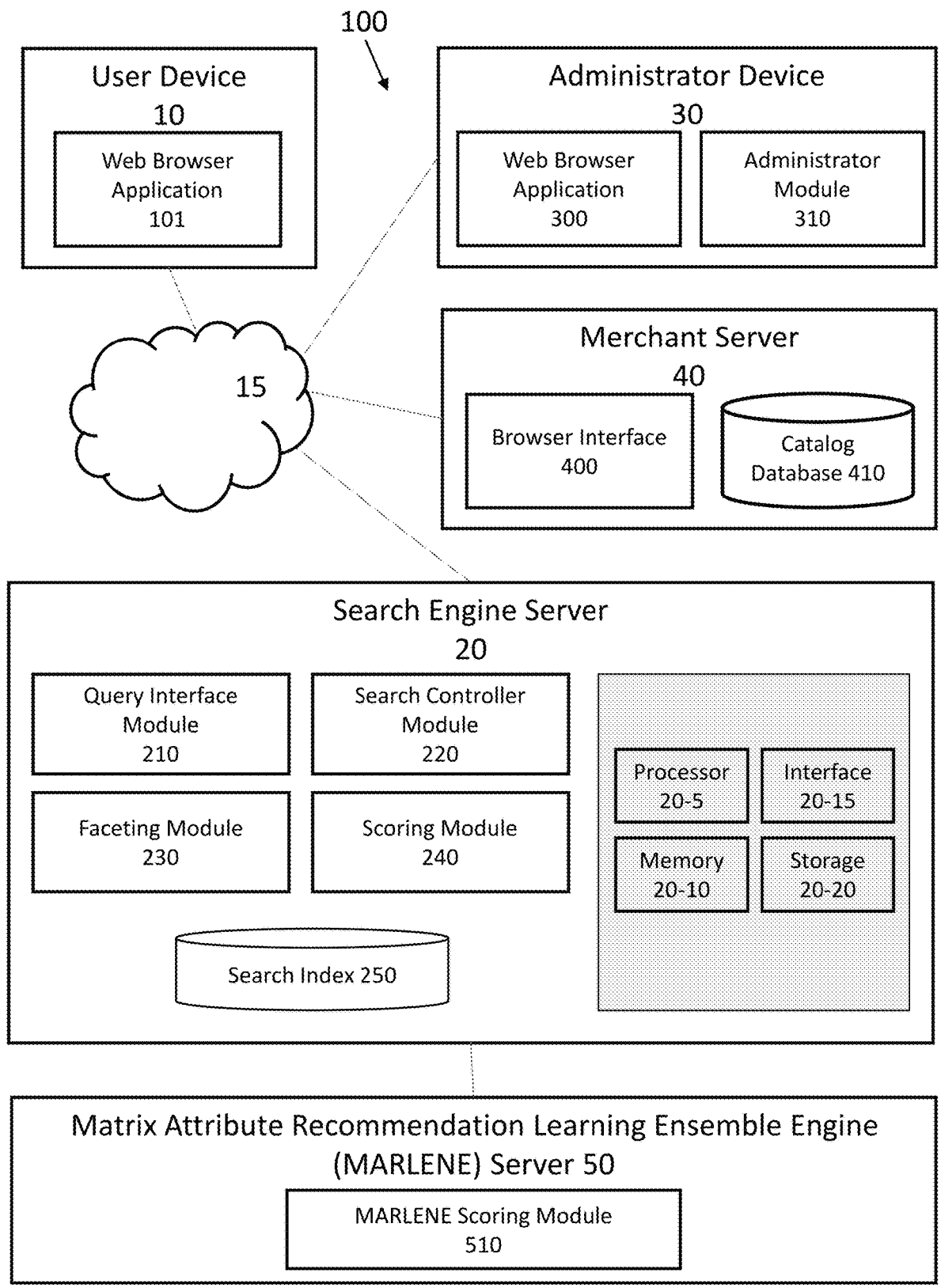
FIG. 1 is a schematic diagram illustrating a system in accordance with an exemplary embodiment of the present invention.

In the context of product searches in one or more catalogs of products in, for example, e-commerce businesses, products have pre-defined "attributes," such as brand, color, material, size, to name a few. Each specific product may be associated some subset of all possible attributes. Each attribute in each product has one or more specific values (e.g., brand=Nike or OCCASION=Evening, Wedding). When a keyword search result or a category browse result contains a number of products, that result may be further limited by selecting only those products from the result that contain a certain "attribute value" (e.g., color=Red). When the result is limited in this way, it is said that a "filter" is applied on the color attribute with the "filter value" Red. Given a keyword search result or a category browse result further filtered by zero or more filter values, one may calculate the number of products in the result corresponding to the various product attribute values contained within the products in the result. For example, one can calculate how many products with size=Extra Large (or XL) or material=Leather are present in the result. Such product counts are referred to as "facet counts." The attributes, such as size or material, for which the counts may be calculated, are referred to as "facets." The specific values of those attributes for which the counts may be calculated are referred to as "facet values." It is not required to calculate facets for all possible attributes present in the result. Typically, only a certain subset of attributes may be selected, usually by a Merchandising Rule.

Many e-commerce businesses use multiple disparate recommendation systems, each of which provides signals relating to recommendation of products and categories of products (e.g., product attributes) to customers and group of customers. They are faced with various technical problems, including:

(1) How to combine the signals from the multiple recommendation systems to make the combined recommendations more relevant and useful than individual recommendations?

(2) Given product recommendations, how to compute product attribute (i.e. facet, facet value) recommendations? Given product attribute recommendations, how to compute product recommendations? Given both, how to implement mutual influence of the product and product attribute recommendations?

(3) Given a weighted blend of product and product attribute recommendation signals, how to learn the weights based on the customer activity?

To address the foregoing and/or other technical problems, at least one embodiment of the present invention may have one or more of the following technical features:

(i) A unified formula for computing product recommendation scores based on a combination of product and attribute recommendation signals.

(ii) A unified formula for computing attribute recommendation scores based on a combination of product and attribute recommendation signals.

(iii) Machine-learning unified formula weights based on product clicks.

(iv) Machine-learning unified formula weights based on product clicks and facet clicks.

Embodiments of the present invention may also provide various practical applications in the areas of keyword search, guided navigation, and product recommendations, including, but not limited to:

(a) Providing personalized product recommendations based on a blend of signals from multiple recommendation systems;

(b) Providing personalized product boosting in keyword search and in guided navigation based on a blend of signals from multiple recommendation systems;

(c) Providing personalized facet and facet value ordering in keyword search and guided navigation results pages based on a blend of signals from multiple recommendation systems;

(d) Improving non-personalized product sequencing in keyword search and guided navigation by incorporating additional signals based on the aggregate customer behavior; and (e) Automatically learning the weights of blended recommendation signals based on the facet and product click feedback.

The methods of the present invention may be operated as part of a system for electronic commerce, such as one shown in FIG. 1. FIG. 1 is a schematic diagram illustrating a system 100 for electronic commerce in accordance with an exemplary embodiment of the present invention. The system 100 may comprise one or more user devices 10 that interact through a network 15, such as the Internet, with one or more merchant servers 40 that offer goods for sale via a web page or electronic application. Search queries generated by online shoppers from one or more user devices 10, such as tablets, smartphones, or computers, to name a few, connected through network 15, such as the Internet or an intranet, may be transmitted to one or more merchant servers 40, which, in turn, may transmit the search query through the network to one or more search engine servers 20. In embodiments, one or more administrator devices 30, connected through the network 15 to one or more merchant servers 40 or one or more search engine servers 20, may be used for configuring such servers. In other embodiments, one or more of the functions of each of these devices and servers may be combined into a single server, and/or divided up among one or more other servers performing duplicate and/or portions of the functions.

Referring to FIG. 1, a search engine server 20 may comprise a query interface module 210 configured to receive search queries and to transmit search results, a search controller module 220 configured to query a search index database 250 to find matches, a faceting module 230 configured to compute facet counts, and a scoring module 240 configured to rank the matches. In embodiments, the scoring module 240 may be further configured to select top K matches from all of the matches, wherein K may be a predetermined number (e.g., 5, 10, 50, 100, to name a few).

In embodiments, the search controller module 220 and the search index database 250 may be modules from a basic document search engine that are capable of a full conventional keyword search using a searchable keyword index. In embodiments, the search index database 250 may comprise one or more documents, each having one or more fields that may be separately indexed for searching. In connection with an electronic commerce application, a "document" may correspond to a particular product sold by a merchant and each searchable field of a "document" may correspond to a certain attribute of the product, such as, but not limited to, brand, size, color, type, etc.

In embodiments, the search index database 250 comprises multiple searchable indices that facilitate the searching of products. Each index may be associated with a particular attribute of a product and is generated from one or more terms corresponding to the particular attribute of all the products.

Referring back to FIG. 1, the search engine server 20 may be connected, either directly as shown in the figure, or through a network such as the Internet 15, a matrix attribute recommendation learning ensemble engine ("MARLENE") server 50. As further described below, the MARLENE server 50 may be configured to compute, using a MARLENE scoring module 510, recommendation scores ("MARLENE scores") based on combined signals from multiple recommendation systems in accordance with an exemplary embodiment of the present invention. In alternative embodiments, the MARLENE server 50 and MARLENE scoring module 510 may be part of the search engine server 20.

Figure 2:
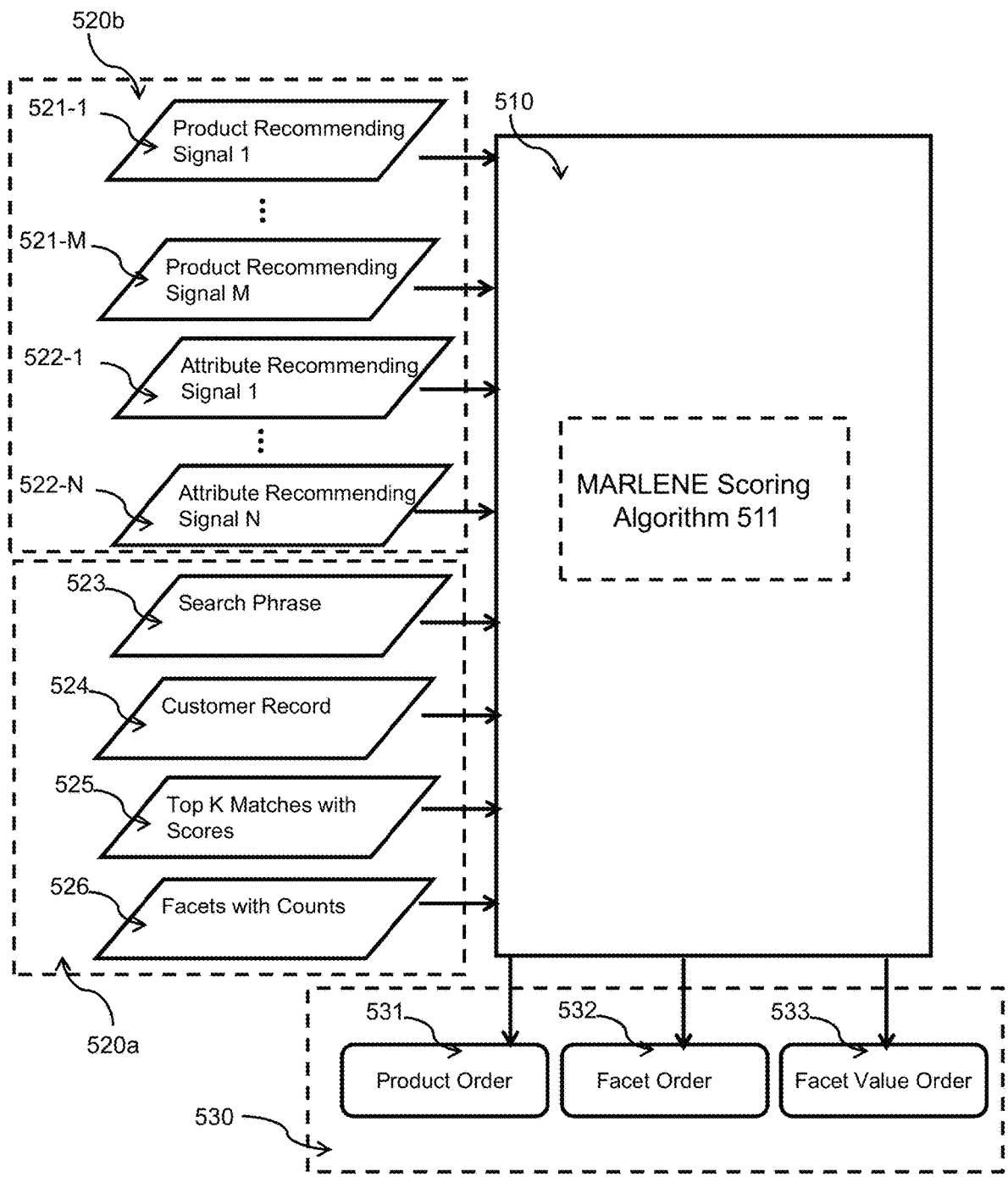
FIG. 2 is a schematic diagram showing exemplary inputs to and exemplary outputs from a module executing a scoring algorithm in accordance with an exemplary embodiment of the present invention.

FIG. 2 schematically illustrates an exemplary operation of the MARLENE scoring module 510. As shown in the figure, the MARLENE scoring module 510 may be configured to receive a set of inputs 520a, which may include some or all of the following: (a) search phrase 523, (b) customer record 524, (c) top K matches with scores 525 from a search, (d) facets with counts 526 for all matches. In embodiments, the inputs 520a to the MARLENE scoring module 510 may further include product category ID and/or a list of product IDs.

The MARLENE scoring module 510 may also receive another set of inputs 520b generated by a plurality of recommendation systems based on some or all of the inputs 520a. This input set 520b may include, as shown in FIG. 2, (a) one or more product recommending signals 521-1, ..., 521-M, (b) one or more attribute recommending signals 522-1, ..., 522-N. In embodiments, the set of inputs 520b to the MARLENE scoring module 510 may further include: attribute-value recommending signals, whitelisting attributes, whitelisting attribute values, blacklisting attributes and blacklisting attribute values, to name a few. In embodiments, the MARLENE scoring module 510 may also be configured to receive as inputs machine-learned or otherwise pre-selected weights $W_1, \ldots, W_{M+N}$, for the corresponding product recommending signals 521-1, ..., 521-M, and attribute recommending signals 522-1, ..., 522-N.

Based on the inputs 520a, 520b, the MARLENE scoring module 510 may execute the MARLENE scoring algorithm 511 to generate a set of outputs 530, which may include product order 531, facet order 532 and facet value order 533 in accordance with an exemplary embodiment of the present invention.

Figure 3:
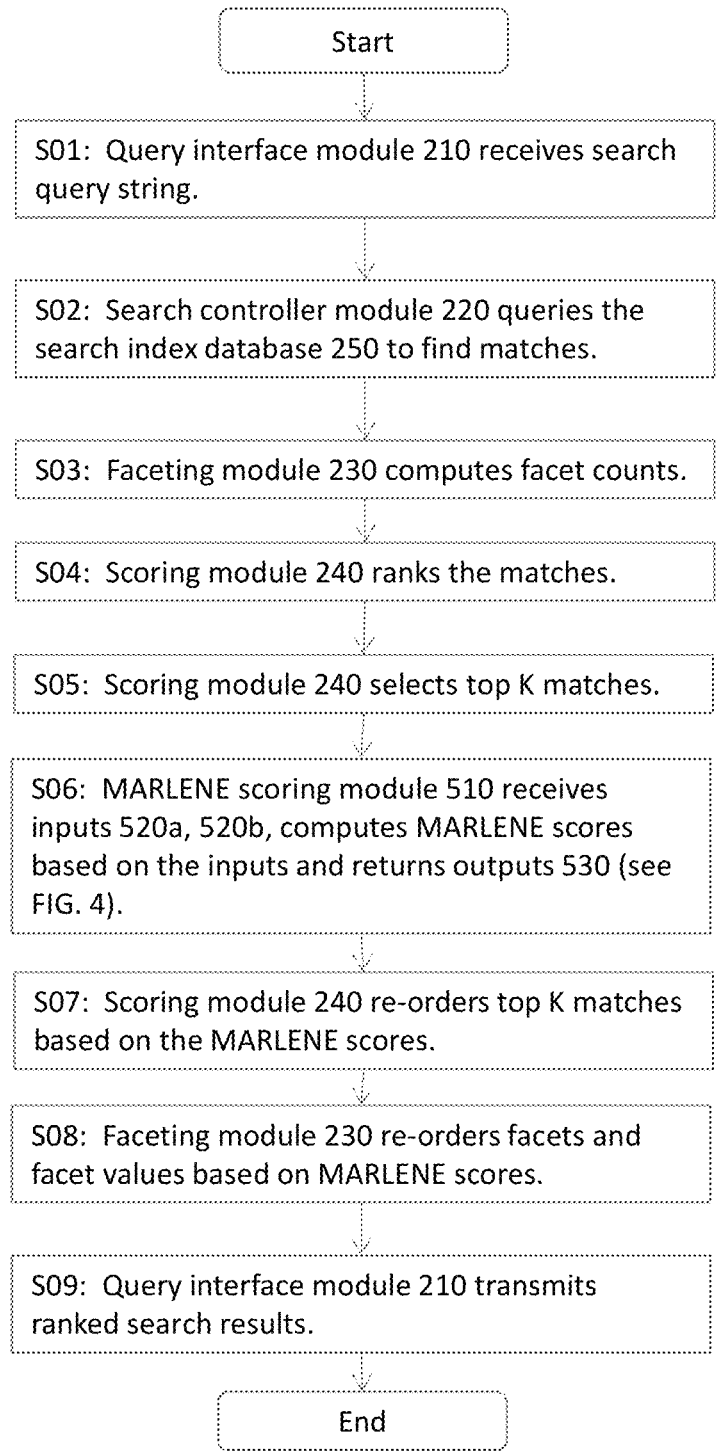
FIG. 3 is a flow chart of a process for performing searches and generating search results in accordance with an exemplary embodiment of the present invention.

FIG. 3 shows a high level flow chart illustrating an exemplary search algorithm for producing ranked search results as executed by the search engine server 20 in accordance with an exemplary embodiment of the present invention. In step S01, the query interface module 210 receives a search query string from a user device 10. In step S02, the search controller module 220 queries the search index database 250 to find matches. In step S03, the faceting module 230 computes facet counts for the matches. In step S04, the scoring module 240 ranks the matches. In step S05, the scoring module 240 selects to top K matches from the matches ranked by step S04. In step S06, the MARLENE scoring module 510 may take over the process, as further illustrated in greater detail in FIG. 4.

Figure 4:
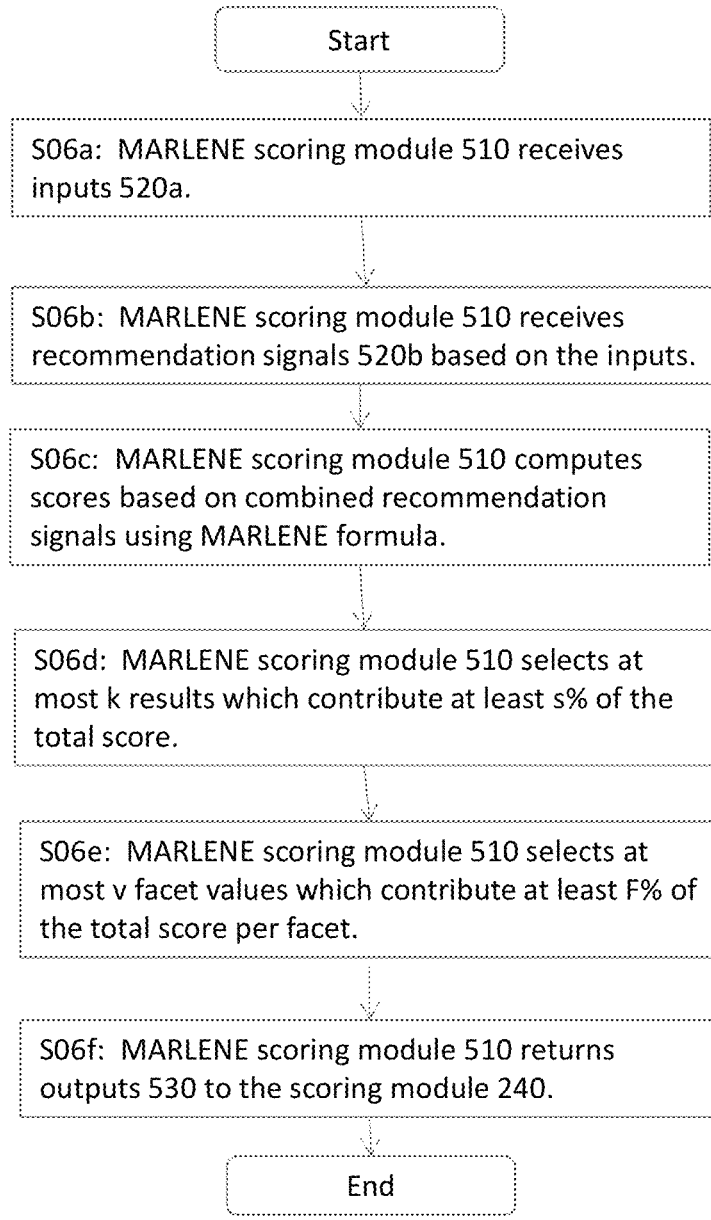
FIG. 4 is a flow chart of a process for calculating recommendation scores based on combined signals from multiple recommendation systems in accordance with an exemplary embodiment of the present invention.

FIG. 4 shows a flow chart illustrating an exemplary scoring algorithm (e.g., MARLENE scoring algorithm 511) for computing recommendation scores based on combined signals from a plurality of recommendation systems as executed by the MARLENE server 50 in accordance with an exemplary embodiment of the present invention. In step S06a, the MARLENE scoring module 510 receives a set of inputs 520a, such as search phrase 523, customer record ID 524, top K matches with scores 525, and facets with counts 526. In step S06b, the MARLENE scoring module 510 receives recommendation signals 520b from a plurality of recommendation systems, such as a plurality of product recommending signals 521-1, ..., 521-M and a plurality of attribute recommending signals 522-1, ..., 522-N. In step S06c, the MARLENE scoring module 510 computes recommendation scores ("MARLENE scores") based on combined recommendation signals from the multiple recommendation systems using MARLENE formula, which is further described below. In step S06d, the MARLENE scoring module 510 selects at most R results, which contribute at least S % of the total MARLENE scores, wherein S % may be a predetermined percentage (e.g., 50%, 75%, 90%, 99%, to name a few) and R is a corresponding integer. In step S06e, the MARLENE scoring module 510 selects at most V facet values which contribute at least F % of the total MARLENE score per facet, wherein F % may be a predetermined percentage (e.g., 50%, 75%, 90%, 99%, to name a few) and V is a corresponding integer. In step S06f, the MARLENE scoring module 510 generates outputs 530 and transmits them to the scoring module 240 and the faceting module 230 of the search engine server 20. The outputs 530 may include K or fewer matches with new recommendation scores (e.g., product order 531), recommended facets in the order of recommendation scores (e.g., facet order 532) and recommended facet values in the order of recommendation scores (e.g., facet value order 533), in accordance with an exemplary embodiment of the present invention.

Referring back to FIG. 3, in step S07, the scoring module 240 receives K or fewer matches with new recommendation scores from the MARLENE scoring module 510 and re-orders them in accordance with the MARLENE scores computed by the MARLENE scoring algorithm 511. In step S08, the faceting module 230 receives recommended facets and recommended facet values from the MARLENE scoring module 510 and re-orders them in accordance with the MARLENE scores computed by the MARLENE scoring algorithm 511. In step S09, the query interface module 210 transmits ranked search results to the user device 10.

In at least one embodiment of the present invention, a formula ("MARLENE formula") for calculating recommendation scores may be derived as follows. Brief explanations of the mathematical terms and notations used herein are provided in the Appendix at the end of this specification.
Properties of Scoring Function $\mathcal{S}$ According to an exemplary embodiment of the present invention, the MARLENE formula may incorporate some or all of the following aspects of the MARLENE scoring algorithm:

(i) Attribute-recommending signals;
(ii) Attribute value-recommending signals;
(iii) Product-recommending signals;
(iv) Whitelisting attributes based on, for example, the facets selected by merchant's merchandising rule framework;
(v) Whitelisting attribute values based on, for example, the value ordering imposed by merchant's merchandising rule framework;
(vi) Blacklisting attributes; and
(vii) Blacklisting attribute values.

In accordance with an exemplary embodiment of the present invention, the MARLENE formula may be in the form of a scoring function S, which may map all of the inputs into a vector of product scores, as shown below in (1):

$$S[p,1] = \mathcal{S}(P,M,Q,R,W_p,W_a)[p,n] \quad (1)$$

wherein:

P is a product matrix P[p, n] of p products, each product having a total of n possible one-hot encoded attribute values, M is a matrix M[a, n] of one-hot encoded attribute-value to attribute assignments, Q is a recommendation signal $Q[q, r_p]$ from $r_p$ product recommenders, R is a recommendation signal $R[n, r_a]$ from $r_a$ attribute- and attribute-value recommenders, $W_p$ is a vector $W_p[r_p, 1]$ of the product recommender weights, and $W_a$ is a vector $W_a[r_a, 1]$ of the attribute- and attribute-value recommender weights.

Examples of inputs to a scoring function S are described below. This particular example involves p=10 products with a=5 possible attributes including: TYPE, BRAND, COLOR, MATERIAL and STYLE. In embodiments, some of these attributes may be optional.

| Product ID | TYPE | BRAND | COLOR | MATERIAL | STYLE |
|---|---|---|---|---|---|
| 1 | Shoes | Nike | Black | Leather | Oxford |
| 2 | Shoes | Adidas | Red | Suede | |
| 3 | Shoes | Nike | White | Leather | Oxford |
| 4 | Pants | Adidas | Blue, Red | Denim | |
| 5 | Pants | Nike | Black | Chino | |
| 6 | Pants | Nike | White | Chino | |
| 7 | Dress | Billabong | Red, White, Blue | Silk | Maxi |
| 8 | Dress | Billabong | Black | Silk | |
| 9 | Dress | Nike | Blue | Nylon | |
| 10 | Blender | Kitchenaid | White | | |

Across p=10 products and a=5 attributes, there may be found n=20 unique attribute values. Exemplary attribute values are one-hot encoded in the following exemplary matrix P[10, 20]:

| Product ID | Shoes | Pants | Dress | Blender | Nike | Adidas | Billabong | Kitchenaid |
|---|---|---|---|---|---|---|---|---|
| 1 | 1 | 0 | 0 | 0 | 1 | 0 | 0 | 0 |
| 2 | 1 | 0 | 0 | 0 | 0 | 1 | 0 | 0 |
| 3 | 1 | 0 | 0 | 0 | 1 | 0 | 0 | 0 |
| 4 | 0 | 1 | 0 | 0 | 0 | 1 | 0 | 0 |
| 5 | 0 | 1 | 0 | 0 | 1 | 0 | 0 | 0 |
| 6 | 0 | 1 | 0 | 0 | 1 | 0 | 0 | 0 |
| 7 | 0 | 0 | 1 | 0 | 0 | 0 | 1 | 0 |
| 8 | 0 | 0 | 1 | 0 | 0 | 0 | 1 | 0 |
| 9 | 0 | 0 | 1 | 0 | 1 | 0 | 0 | 0 |
| 10 | 0 | 0 | 0 | 1 | 0 | 0 | 0 | 1 |

| Product ID | Black | White | Red | Blue | Leather | Suede |
|---|---|---|---|---|---|---|
| 1 | 1 | 0 | 0 | 0 | 1 | 0 |
| 2 | 0 | 0 | 1 | 0 | 0 | 1 |
| 3 | 0 | 1 | 0 | 0 | 1 | 0 |
| 4 | 0 | 0 | 1 | 1 | 0 | 0 |
| 5 | 1 | 0 | 0 | 0 | 0 | 0 |
| 6 | 0 | 1 | 0 | 0 | 0 | 0 |
| 7 | 0 | 1 | 1 | 1 | 0 | 0 |
| 8 | 1 | 0 | 0 | 0 | 0 | 0 |
| 9 | 0 | 0 | 0 | 1 | 0 | 0 |
| 10 | 0 | 1 | 0 | 0 | 0 | 0 |

| Product ID | Denim | Chino | Silk | Nylon | Oxford | Maxi |
|---|---|---|---|---|---|---|
| 1 | 0 | 0 | 0 | 0 | 1 | 0 |
| 2 | 0 | 0 | 0 | 0 | 0 | 0 |
| 3 | 0 | 0 | 0 | 0 | 1 | 0 |
| 4 | 1 | 0 | 0 | 0 | 0 | 0 |
| 5 | 0 | 1 | 0 | 0 | 0 | 0 |
| 6 | 0 | 1 | 0 | 0 | 0 | 0 |
| 7 | 0 | 0 | 1 | 0 | 0 | 1 |
| 8 | 0 | 0 | 1 | 0 | 0 | 0 |
| 9 | 0 | 0 | 0 | 1 | 0 | 0 |
| 10 | 0 | 0 | 0 | 0 | 0 | 0 |

The above attribute values may be assigned to attributes via an exemplary block assignment matrix M[5, 20] as shown below:

| Attribute | Shoes | Pants | Dress | Blender | Nike | Adidas | Billabong | Kitchenaid |
|---|---|---|---|---|---|---|---|---|
| TYPE | 1 | 1 | 1 | 1 | 0 | 0 | 0 | 0 |
| BRAND | 0 | 0 | 0 | 0 | 1 | 1 | 1 | 1 |
| COLOR | 0 | 0 | 0 | 0 | 0 | 0 | 0 | 0 |
| MATERIAL | 0 | 0 | 0 | 0 | 0 | 0 | 0 | 0 |
| STYLE | 0 | 0 | 0 | 0 | 0 | 0 | 0 | 0 |

| Attribute | Black | White | Red | Blue | Leather | Suede |
|---|---|---|---|---|---|---|
| TYPE | 0 | 0 | 0 | 0 | 0 | 0 |
| BRAND | 0 | 0 | 0 | 0 | 0 | 0 |
| COLOR | 1 | 1 | 1 | 1 | 0 | 0 |
| MATERIAL | 0 | 0 | 0 | 0 | 1 | 1 |
| STYLE | 0 | 0 | 0 | 0 | 0 | 0 |

| Attribute | Denim | Chino | Silk | Nylon | Oxford | Maxi |
|---|---|---|---|---|---|---|
| TYPE | 0 | 0 | 0 | 0 | 0 | 0 |
| BRAND | 0 | 0 | 0 | 0 | 0 | 0 |
| COLOR | 0 | 0 | 0 | 0 | 0 | 0 |
| MATERIAL | 1 | 1 | 1 | 1 | 0 | 0 |
| STYLE | 0 | 0 | 0 | 0 | 1 | 1 |

In this example, the current page may be rendered for a customer who received Attribute Recommendation Signals from, for example, three available Attribute Recommenders $r_a(1)$, $r_a(2)$ and $r_a(3)$.

$r_a(1)$ may be, for example, an attribute recommender rather than attribute value recommender, and recommends, for example, COLOR and STYLE attributes as important for the customer. To achieve this, this attribute recommender may produce, for example, the same recommendation score for all values of COLOR and the same recommendation score for all values of STYLE.

$r_a(2)$ may be, for example, a facet value count recommender. Its recommendation scores may be calculated based on an assumption that all 10 products are in the result set.

$r_a(3)$ may be, for example, a brand propensity recommender. It may assign a dollar amount to each BRAND, predicting the customer's spend in the next few months.

With the above assumptions, the recommendation signal matrix R[20, 3] may look like the following:

| Attribute Value | $r_a(1)$ | $r_a(2)$ | $r_a(3)$ |
|---|---|---|---|
| Shoes | 0 | 3 | 0 |
| Pants | 0 | 3 | 0 |
| Dress | 0 | 3 | 0 |
| Blender | 0 | 1 | 0 |
| Nike | 0 | 5 | 50 |
| Adidas | 0 | 2 | 400 |
| Billabong | 0 | 2 | 200 |
| Kitchenaid | 0 | 1 | 500 |
| Black | 50 | 3 | 0 |
| White | 50 | 4 | 0 |
| Red | 50 | 3 | 0 |
| Blue | 50 | 3 | 0 |
| Leather | 0 | 2 | 0 |
| Suede | 0 | 1 | 0 |
| Denim | 0 | 1 | 0 |
| Chino | 0 | 2 | 0 |
| Silk | 0 | 2 | 0 |
| Nylon | 0 | 1 | 0 |
| Oxford | 100 | 2 | 0 |
| Maxi | 100 | 1 | 0 |

Similarly, assuming that the customer received Product Recommendation Signals from, for example, two available Product Recommenders, $r_p(1)$ and $r_p(2)$, the recommendation signal matrix Q[10, 2] may look like the following:

| Product ID | $r_p(1)$ | $r_p(2)$ |
|---|---|---|
| 1 | 0 | 0 |
| 2 | 0 | 10000 |
| 3 | 0 | 0 |
| 4 | 0 | 0 |
| 5 | 5 | 0 |
| 6 | 4 | 0 |
| 7 | 3 | 0 |
| 8 | 2 | 5000 |
| 9 | 1 | 0 |
| 10 | 0 | 0 |

While the weights of attribute and product recommenders $W_a$ and $W_p$ can be machine-learned, it is assumed that they are all preset to 1.0 in this example.

In embodiments, machine learning of the signal weight vectors $W_p$ and $W_a$ may be implemented in the scoring function S. To support machine learning of the weight vectors, the scoring function S may require additional properties.

For example, as shown below in (2a) and (2b), there may be found two different ways of expressing the scoring function $\mathcal{S}$ via other functions, using only part of the inputs each:

$$\mathcal{S} = \mathcal{S}_1(\mathcal{F}_p(Q,W_p)[p,1], \mathcal{F}_{a1}(P,M,R,W_a)[p,1])$$

$$\mathcal{S} = \mathcal{S}_2(\mathcal{F}_p(Q,W_p)[p,1], \mathcal{F}_{a2}(P,M,R,W_a)[n,1]) \quad (2a, 2b)$$

The benefit of such representation of the scoring function would be that $\mathcal{F}_p$ would use only product recommendation signals, and $\mathcal{F}_a$ would use only attribute recommendation signals.

The difference between $\mathcal{F}_{a1}$ and $\mathcal{F}_{a2}$ is that product signal is produced by using attribute recommendations in $\mathcal{F}_{a1}$, while attribute value signal is produced by using attribute recommendations in $\mathcal{F}_{a2}$.

In embodiments, there may be found further functions $\phi_p$, $\phi_{a1}$, and $\phi_{a2}$, which are independent from the signal weights $W_p$ and $W_a$, such that:

$$\phi_p[p,r_p] \Rightarrow \mathcal{A}_p(Q,W_p) = \mathcal{A}_p(\phi_p(Q),W_p)[p,1]$$

$$\phi_{a1}[p,r_a] \Rightarrow \mathcal{A}_{a1}(P,M,R,W_a) = \mathcal{A}_{a1}(\phi_{a1}(P,M,R),W_a)[p,1]$$

$$\phi_{a2}[n,r_a] \Rightarrow \mathcal{A}_{a2}(P,M,R,W_a) = \mathcal{A}_{a2}(\phi_{a2}(P,M,R),W_a)[n,1] \quad (3a\text{-}3c)$$

If product scores can be expressed in this way, then $\phi_p$, $\phi_{a1}$, and $\phi_{a2}$ can be used as feature vectors in machine learning algorithms in order to learn weights $W_p$ and $W_a$. In embodiments, these feature vectors may be returned from the MARLENE scoring module 510 with its application programming interface (API) response, and tagged onto products and facet values. In such a case, the difference between $\phi_{a1}[p, r_a]$ and $\phi_{a2}[n, r_a]$ is that the former may be used with a product-based feedback signal (e.g., position on the page of a viewed product), while the latter may be used with facet-based feedback signal (e.g., position on the page of a clicked facet value).

As shown below in (4), an attribute value score vector V[n, 1] can be expressed in terms of $\mathcal{F}_{a2}$ which directly scores all attribute values:

$$V[n,1] = \mathcal{F}_{a2}(\phi_{a2},W_a)[n,1] \quad (4)$$

Given the attribute value scores V[n, 1], there may be found a function $\mathcal{S}$ for scoring the attributes themselves. Given a attributes with n possible values across all a, the function $\mathcal{S}$ may be expressed as:

$$\mathcal{S}(V) = A[a,1] \quad (5)$$

where A[a, 1] is the vector of attribute scores.

Derivation of Scoring Function $\mathcal{S}$

Product Recommendation Signals:

Product recommendation signals may assign a score to every product, so their output may be a matrix of scores. Given $r_p$ product recommenders with weights $W_p[r_p, 1]$, there may be Q[q, $r_p$] product scores. In general, product recommenders provide signal for a set q which may be different from set p. In such a case, only the relevant recommendations need to be extracted.

In embodiments, two vectors, Z[p, 1] and Z[q, 1], may contain product IDs in the corresponding vector positions as shown below in (6a) and (6b):

$$Z[p, 1] = \bigcup_{i=1}^{p} \text{product\_id}(i)$$

$$Z[q, 1] = \bigcup_{i=1}^{q} \text{product\_id}(i) \quad (6a, 6b)$$

As shown below in (7), a left join operation can be performed on the first column to get the scores only for the products from the set p:

$$Q[p,r_p+1] = Z[p,1] \bowtie_1 (Z[q,1] \cup Q[q,r_p]) \quad (7)$$

where a "left join" of matrix A to matrix B on a column j is defined as a mathematical operation for creating a new matrix A⋈B with all columns from A and from B, where columns borrowed from B in those rows where A(i,j)=B(i,j) have the values from B, and zero in the rest of the rows, as shown below in (8):

$$A[a, b] \bowtie_j B[c, d] = C[a, b + d - 1]: \tag{8}$$

$$\begin{cases} C(i, b + \ldots) = B(i, x) \forall i: \exists B(i, j): A(i, j) = B(i, j), x \neq j \\ C(i, b + \ldots) = 0.0 \forall i: \nexists B(i, j): A(i, j) = B(i, j) \end{cases}$$

After the left join operation is performed, as shown below in (9), the first column of product IDs can be dropped since it is no longer necessary:

$$Q[p, r_p] = \bigcup_{i=2}^{r_p} (Q[p, r_p + 1](p, i))[p, 1] \tag{9}$$

Finally, to ensure that the signals from different product recommenders are commensurate, the matrix $Q[p, r_p]$ may be normalized column-wise as shown below in (10):

$$\hat{Q}[p, \hat{r}_p] \tag{10}$$

In addition, for ease of use, the vector of product recommender weights can also be normalized such that all resulting product scores are in the range [0, 1].

In embodiments, a vector defined by a product of the normalized product score matrix and the normalized product recommender weights vector $B[p,1]=\hat{Q}[p, \hat{r}_p] \cdot [\hat{w}_p, 1]$, can be used as a multiplicative boost vector in the definition of $S[p, 1]$.

Referring back to the sample input data used in the example described above, assuming that L1-normalization is used in all examples, $\hat{Q}[p, \hat{r}_p]$ based on the sample input data may look like the following:

| Product ID | $\widehat{r_p(1)}$ | $\widehat{r_p(2)}$ |
|---|---|---|
| 1 | 0 | 0 |
| 2 | 0 | 0.6667 |
| 3 | 0 | 0 |
| 4 | 0 | 0 |
| 5 | 0.3333 | 0 |
| 6 | 0.2667 | 0 |
| 7 | 0.2 | 0 |
| 8 | 0.1333 | 0.333 |
| 9 | 0.0667 | 0 |
| 10 | 0 | 0 |

Given the above-mentioned assumption that the weights of attribute and product recommenders $W_a$ and $W_p$ are preset to 1.0 for all recommenders, the normalized vector of product recommender weights $\hat{w}[\hat{r}_p, 1]=(0.5,0.5)$ and $B[p, 1]$ becomes:

| Product ID | Calculation | B |
|---|---|---|
| 1 | 0 * 0.5 + 0 * 0.5 | 0 |
| 2 | 0 * 0.5 + 0.6667 * 0.5 | 0.3333 |
| 3 | 0 * 0.5 + 0 * 0.5 | 0 |
| 4 | 0 * 0.5 + 0 * 0.5 | 0 |
| 5 | 0.333 * 0.5 + 0 * 0.5 | 0.1667 |
| 6 | 0.2667 * 0.5 + 0 * 0.5 | 0.1333 |
| 7 | 0.2 * 0.5 + 0 * 0.5 | 0.1 |
| 8 | 0.1333 * 0.5 + 0.3333 * 0.5 | 0.2333 |
| 9 | 0.0667 * 0.5 + 0 * 0.5 | 0.0333 |
| 10 | 0 * 0.5 + 0 * 0.5 | 0 |

Attribute- and Attribute-Value Recommendation Signals

Attribute recommendation signals produce recommendations for whole attributes. Such recommendations do not depend on the number of attribute value hits in a product, as long as there is at least one value hit.

Each attribute recommender produces a single vector of length n where all possible values of each recommended attribute are set to the same recommendation score of the corresponding attribute.

Given r attribute recommenders, their output can be represented as a matrix $R[n, r_a]$, and the scores of the products based on the attribute recommendations can be calculated as follows:

$$S[p,r_a]=P[p,n] \cdot R[n,r_a] \tag{11}$$

Attribute-value recommendation signals produce recommendations for specific attribute values, so not every element in the attribute value vectors has the same value as in the case of attribute recommenders. But the approach can be the same as attribute recommendation signals, as long as the recommendation signals are normalized to make them commensurate as shown below in (12):

$$S[p,r_a]=P[p,n] \cdot \hat{R}[n, \widehat{r_a}] \tag{12}$$

In view of the foregoing, there may be no need to make a distinction between attribute value recommenders and attribute recommenders. The latter can be simply considered to recommend every value of the recommended attribute with the same score.

In addition, the quality of attribute-based product scoring may be enhanced if product recommendation scores are used as a multiplicative boost for the attribute recommendations as shown below in (13):

$$S[p,r_a]=(P[p,n] \cdot \hat{R}[n, \widehat{r_a}]) \times B[p,1] \tag{13}$$

In this approach, the product recommendation signal may be lost for those products which do not have any attribute value recommendation hits (for such products, e.g., $S(i)=0$ $[1, r_a]$), and the attribute recommendation signal may be lost for those products which do not have any product recommendation hits (for such products, e.g., $B(i)=0.0$). To rectify this problem, in embodiments, a very small value $\in$ may be added to each element of the product matrix P, and to each element of the boost vector B, so that $S(i)=(\in*B(i))[1,r_a])$, $B(i)=\in$ instead of 0.0. This can be accomplished by initializing a matrix $\epsilon[p,n]$ and a vector $\epsilon[p, 1]$ with the same value $\in$ in all its elements, as shown below in (14):

$$S[p,r_a]=((P[p,n]+\epsilon[p,n]) \cdot \hat{R}[n, \widehat{r_a}]) \times (B[p,1]+\epsilon[p,1]) \tag{14}$$

The small value $\in$ must be smaller than any non-zero recommendation signal but not so small that powers of $\in$ would cause an overflow.

Whitelisting and Blacklisting Attributes and Attribute Values

Whitelisting of attributes can be expressed as a set of multiplicative scores over attribute values, where all allowed values have score 1.0, and all disallowed values have score 0.0. If several white-lists are provided, they can be combined via element-wise multiplication as shown below in (15):

$$L[n, 1] = \prod_w L_w[n, 1] \tag{15}$$

As shown below in (16), blacklisting can be implemented through additional vectors $L_b[n,1]$, where individual blacklisted values are assigned the score 0.0, and all values of the blacklisted attributes are assigned score 0.0:

$$L[n,1] = \prod_w L_w[n,1] \times \prod_b L_b[n,1] \quad (16)$$

As shown below in (17), the multiplicative scores vector can be applied via column-wise product with attribute value scores, before column normalization:

$$S[p,r_a] = ((P[p,n] + \varepsilon[p,n]) \cdot (\overset{\frown}{R \times L})[n, \vec{r}_a]) \times (B[p,1] + \varepsilon[p,1]) \quad (17)$$

To prevent product attributes with several values from having more influence than product attributes with only one value, the matrix P and attribute value recommendations may be block averaged (e.g., only after applying the whitelists) as shown below in (18):

$$S[p,r_a] = (((P|M)[p,n] + \varepsilon[p,n]) \cdot ((R \overset{\frown}{\times L}) |M)[n, \vec{r}_a]) \times (B[p,1] + \varepsilon[p,1]) \quad (18)$$

But this solution (18) may still lose product recommendation signal B(i) for those products which do not have any hits in the white-listed attribute recommendations. In order to still be able to rank such products based on B(i), another small value $\varepsilon[n, r_a]$ may be introduced to ensure that blacklisted attribute values remain blacklisted. To preserve blacklist zeros, it may be multiplied by L:

$$S[p,r_a] = (((P|M)[p,n] + \varepsilon[p,n]) \cdot (((R \overset{\frown}{\times L}) |M)[n, \vec{r}_a] + (\varepsilon \times L))) \times (B[p,1] + \varepsilon[p,1]) \quad (19)$$

In the actual code implementation, it may be faster to adjust a matrix by replacing all zeros with $\in$ than to initialize and add the $\varepsilon$-matrix. Such adjusted matrices are denoted herein with the "$\in$" subscript.

Based on the observation that:

$$L \times L = L \Rightarrow (X \times L) + (\varepsilon \times L) = (X \times L \times L) + (\varepsilon \times L) = (X \times L + \varepsilon) \times L \approx (X \times L)_\varepsilon \times L$$

the following formula may be obtained:

$$S[p,r_a] = ((P|M)_\varepsilon[p,n] \cdot (((R \overset{\frown}{\times L}) |M)_\varepsilon[n, \vec{r}_a] \times L)) \times B_\varepsilon[p,1] \quad (20)$$

Total Product Scoring

For brevity, a name U may be assigned to the adjusted attribute value recommendations matrix:

$$U[n, r_a] = ((R \overset{\frown}{\times L}) |M)_\in[n, \vec{r}_a] \times L[n,1] \quad (21)$$

Total product scores may be calculated via dot-multiplication with the attribute recommender weights. All elements of the dot-product with $U[n, r_a]$ belong to the range (0, 1] and all elements of $B_\in[p,1]$ belong to the range (0, 1]. Therefore, all elements of $S[p, r_a]$ belong to the range (0, 1] as well. To keep the final product scores in the same range, $W_a$ may be normalized as shown in (22):

$$S[p,1] = (((P|M)_\in[p,n] \cdot U[n, r_a]) \times B_\in[p,1]) \cdot \vec{W}_a[\vec{r}_a, 1] \quad (22)$$

After re-arranging the terms in (21), the scoring function $\mathcal{S}$ may be expressed as the formula shown below in (23):

$$S[p,1] = B_\in[p,1] \times ((P|M)_\in[p,n] \cdot U[n, r_a] \cdot \vec{W}_a[\vec{r}_a,1]) \quad (23)$$

This formula (23) for the scoring function does not lose signals when a product has no attribute recommendation hits, or when a product has no product recommendation hits.

Referring back to the example based on the sample data described above, assuming that $\in = 10^{-12}$, epsilon-adjusted $B_\in[p,1]$ becomes:

| Product ID | $B_\varepsilon$ |
|---|---|
| 1 | $10^{-12}$ |
| 2 | 0.3333 |
| 3 | $10^{-12}$ |
| 4 | $10^{-12}$ |
| 5 | 0.1667 |
| 6 | 0.1333 |
| 7 | 0.1 |
| 8 | 0.2333 |
| 9 | 0.0333 |
| 10 | $10^{-12}$ |

Block-averaging and epsilon-adjusting product matrix yields the following $(P|M)_\in[10,20]$:

| Product ID | Shoes | Pants | Dress | Blender | Nike | Adidas | Billabong | Kitchenaid |
|---|---|---|---|---|---|---|---|---|
| 1 | 1 | $10^{-12}$ | $10^{-12}$ | $10^{-12}$ | 1 | $10^{-12}$ | $10^{-12}$ | $10^{-12}$ |
| 2 | 1 | $10^{-12}$ | $10^{-12}$ | $10^{-12}$ | $10^{-12}$ | 1 | $10^{-12}$ | $10^{-12}$ |
| 3 | 1 | $10^{-12}$ | $10^{-12}$ | $10^{-12}$ | 1 | $10^{-12}$ | $10^{-12}$ | $10^{-12}$ |
| 4 | $10^{-12}$ | 1 | $10^{-12}$ | $10^{-12}$ | $10^{-12}$ | 1 | $10^{-12}$ | $10^{-12}$ |
| 5 | $10^{-12}$ | 1 | $10^{-12}$ | $10^{-12}$ | 1 | $10^{-12}$ | $10^{-12}$ | $10^{-12}$ |
| 6 | $10^{-12}$ | 1 | $10^{-12}$ | $10^{-12}$ | 1 | $10^{-12}$ | $10^{-12}$ | $10^{-12}$ |
| 7 | $10^{-12}$ | $10^{-12}$ | 1 | $10^{-12}$ | $10^{-12}$ | $10^{-12}$ | 1 | $10^{-12}$ |
| 8 | $10^{-12}$ | $10^{-12}$ | 1 | $10^{-12}$ | $10^{-12}$ | $10^{-12}$ | 1 | $10^{-12}$ |
| 9 | $10^{-12}$ | $10^{-12}$ | 1 | $10^{-12}$ | 1 | $10^{-12}$ | $10^{-12}$ | $10^{-12}$ |
| 10 | $10^{-12}$ | $10^{-12}$ | $10^{-12}$ | 1 | $10^{-12}$ | $10^{-12}$ | $10^{-12}$ | 1 |

| Product ID | Black | White | Red | Blue | Leather | Suede |
|---|---|---|---|---|---|---|
| 1 | 1 | $10^{-12}$ | $10^{-12}$ | $10^{-12}$ | 1 | $10^{-12}$ |
| 2 | $10^{-12}$ | $10^{-12}$ | 1 | $10^{-12}$ | $10^{-12}$ | 1 |
| 3 | $10^{-12}$ | 1 | $10^{-12}$ | $10^{-12}$ | 1 | $10^{-12}$ |
| 4 | $10^{-12}$ | $10^{-12}$ | 0.5 | 0.5 | $10^{-12}$ | $10^{-12}$ |
| 5 | 1 | $10^{-12}$ | $10^{-12}$ | $10^{-12}$ | $10^{-12}$ | $10^{-12}$ |
| 6 | $10^{-12}$ | 1 | $10^{-12}$ | $10^{-12}$ | $10^{-12}$ | $10^{-12}$ |
| 7 | $10^{-12}$ | 0.3333 | 0.3333 | 0.3333 | $10^{-12}$ | $10^{-12}$ |
| 8 | 1 | $10^{-12}$ | $10^{-12}$ | $10^{-12}$ | $10^{-12}$ | $10^{-12}$ |
| 9 | $10^{-12}$ | $10^{-12}$ | $10^{-12}$ | 1 | $10^{-12}$ | $10^{-12}$ |
| 10 | $10^{-12}$ | 1 | $10^{-12}$ | $10^{-12}$ | $10^{-12}$ | $10^{-12}$ |

| Product ID | Denim | Chino | Silk | Nylon | Oxford | Maxi |
|---|---|---|---|---|---|---|
| 1 | $10^{-12}$ | $10^{-12}$ | $10^{-12}$ | $10^{-12}$ | 1 | $10^{-12}$ |
| 2 | $10^{-12}$ | $10^{-12}$ | $10^{-12}$ | $10^{-12}$ | $10^{-12}$ | $10^{-12}$ |
| 3 | $10^{-12}$ | $10^{-12}$ | $10^{-12}$ | $10^{-12}$ | 1 | $10^{-12}$ |
| 4 | 1 | $10^{-12}$ | $10^{-12}$ | $10^{-12}$ | $10^{-12}$ | $10^{-12}$ |
| 5 | $10^{-12}$ | 1 | $10^{-12}$ | $10^{-12}$ | $10^{-12}$ | $10^{-12}$ |
| 6 | $10^{-12}$ | 1 | $10^{-12}$ | $10^{-12}$ | $10^{-12}$ | $10^{-12}$ |
| 7 | $10^{-12}$ | $10^{-12}$ | 1 | $10^{-12}$ | $10^{-12}$ | 1 |
| 8 | $10^{-12}$ | $10^{-12}$ | 1 | $10^{-12}$ | $10^{-12}$ | $10^{-12}$ |
| 9 | $10^{-12}$ | $10^{-12}$ | $10^{-12}$ | 1 | $10^{-12}$ | $10^{-12}$ |
| 10 | $10^{-12}$ | $10^{-12}$ | $10^{-12}$ | $10^{-12}$ | $10^{-12}$ | $10^{-12}$ |

For example, let's assume that for some business reason, it is not permitted to consider BRAND=Adidas in the recommendations. That means that this attribute value is black-listed, so the whitelist L of attribute values may look like the following:

| Attribute Value | L |
|---|---|
| Shoes | 1 |
| Pants | 1 |
| Dress | 1 |
| Blender | 1 |
| Nike | 1 |
| Adidas | 0 |

-continued

| Attribute Value | L |
|---|---|
| Billabong | 1 |
| Kitchenaid | 1 |
| Black | 1 |
| White | 1 |
| Red | 1 |
| Blue | 1 |
| Leather | 1 |
| Suede | 1 |
| Denim | 1 |
| Chino | 1 |
| Silk | 1 |
| Nylon | 1 |
| Oxford | 1 |
| Maxi | 1 |

Now the epsilon-adjusted white-listed normalized and block-averaged attribute recommendations U[20, 3] may be calculated as follows:

| Attribute Value | $r_a(1) \times$ L | $(r_a(1) \times$ L)/M | U (1) | $r_a(2) \times$ L | $(r_a(2) \times$ L)/M | U (2) | $r_a(3) \times$ L | $(r_a(3) \times$ L)/M | U (3) |
|---|---|---|---|---|---|---|---|---|---|
| Shoes | 0 | 0 | $10^{-12}$ | 3 | 0.3 | 0.06 | 0 | 0 | $10^{-12}$ |
| Pants | 0 | 0 | $10^{-12}$ | 3 | 0.3 | 0.06 | 0 | 0 | $10^{-12}$ |
| Dress | 0 | 0 | $10^{-12}$ | 3 | 0.3 | 0.06 | 0 | 0 | $10^{-12}$ |
| Blender | 0 | 0 | $10^{-12}$ | 1 | 0.1 | 0.02 | 0 | 0 | $10^{-12}$ |
| Nike | 0 | 0 | $10^{-12}$ | 5 | 0.625 | 0.125 | 50 | 0.0667 | 0.0667 |
| Adidas | 0 | 0 | 0 | 0 | 0 | 0 | 0 | 0 | 0 |
| Billabong | 0 | 0 | $10^{-12}$ | 2 | 0.25 | 0.05 | 200 | 0.2667 | 0.2667 |
| Kitchenaid | 0 | 0 | $10^{-12}$ | 1 | 0.125 | 0.025 | 500 | 0.0667 | 0.0667 |
| Black | 50 | 0.25 | 0.125 | 3 | 0.2308 | 0.0462 | 0 | 0 | $10^{-12}$ |
| White | 50 | 0.25 | 0.125 | 4 | 0.3077 | 0.0615 | 0 | 0 | $10^{-12}$ |
| Red | 50 | 0.25 | 0.125 | 3 | 0.2308 | 0.0462 | 0 | 0 | $10^{-12}$ |
| Blue | 50 | 0.25 | 0.125 | 3 | 0.2308 | 0.0462 | 0 | 0 | $10^{-12}$ |
| Leather | 0 | 0 | $10^{-12}$ | 2 | 0.2222 | 0.0444 | 0 | 0 | $10^{-12}$ |
| Suede | 0 | 0 | $10^{-12}$ | 1 | 0.1111 | 0.0222 | 0 | 0 | $10^{-12}$ |
| Denim | 0 | 0 | $10^{-12}$ | 1 | 0.1111 | 0.0222 | 0 | 0 | $10^{-12}$ |
| Chino | 0 | 0 | $10^{-12}$ | 2 | 0.2222 | 0.0444 | 0 | 0 | $10^{-12}$ |
| Silk | 0 | 0 | $10^{-12}$ | 2 | 0.2222 | 0.0444 | 0 | 0 | $10^{-12}$ |
| Nylon | 0 | 0 | $10^{-12}$ | 1 | 0.1111 | 0.0222 | 0 | 0 | $10^{-12}$ |
| Oxford | 100 | 0.5 | 0.25 | 2 | 0.6667 | 0.1333 | 0 | 0 | $10^{-12}$ |
| Maxi | 100 | 0.5 | 0.25 | 1 | 0.3333 | 0.0667 | 0 | 0 | $10^{-12}$ |

Given the assumption that preset weights equal to 1.0 for all recommenders, the normalized vector of attribute recommender weights $\hat{v}_p[\hat{v}_p, 1] = (0.3333, 0.3333, 0.3333)$, and the attribute value recommendation vector becomes:

| Attribute Value | $U \cdot \hat{W}_a$ |
|---|---|
| Shoes | 0.02 |
| Pants | 0.02 |
| Dress | 0.02 |
| Blender | 0.0067 |
| Nike | 0.0639 |
| Adidas | 0 |
| Billabong | 0.1056 |
| Kitchenaid | 0.2306 |
| Black | 0.0571 |
| White | 0.0622 |
| Red | 0.0571 |
| Blue | 0.0571 |
| Leather | 0.0148 |
| Suede | 0.0074 |
| Denim | 0.0074 |
| Chino | 0.0148 |
| Silk | 0.0148 |
| Nylon | 0.0074 |
| Oxford | 0.1278 |
| Maxi | 0.1056 |

S[p, 1] can be calculated from the above tables for $B \in [10,1]$, $(P|M)_\epsilon \in [10,20]$ and $(U \cdot \vec{W}_a)[20,1]$:

| Product | $(P|M)_\epsilon \cdot U \cdot \vec{W}_a$ | S |
|---|---|---|
| 1 | 0.2835 | $0.2835 * 10^{-12}$ |
| 2 | 0.0845 | 0.0282 |
| 3 | 0.2886 | $0.2886 * 10^{-12}$ |
| 4 | 0.0845 | $0.0845 * 10^{-12}$ |
| 5 | 0.1558 | 0.0260 |
| 6 | 0.1609 | 0.0214 |

-continued

| Product | $(P|M)_\epsilon \cdot U \cdot \vec{W}_a$ | S |
|---|---|---|
| 7 | 0.3047 | 0.0305 |
| 8 | 0.1974 | 0.0461 |
| 9 | 0.1484 | 0.0049 |
| 10 | 0.2994 | $0.2994 * 10^{-12}$ |
| Total |  | 0.1570 |

From the above-calculated recommendation scores, the following product ranking may be obtained:

| Product ID | Rank |
|---|---|
| 1 | 9 |
| 2 | 3 |
| 3 | 8 |
| 4 | 10 |
| 5 | 4 |
| 6 | 5 |
| 7 | 2 |
| 8 | 1 |
| 9 | 6 |
| 10 | 7 |

In embodiments, it may sometimes be necessary to boost only "high-confidence" recommendations, instead of re-ranking the entire top-K results based on which the recommended ranks were computed. In such a case, not more than X products, which contribute not more than Y % of the total recommendation score, may be chosen. For example, if Y=80% and X=3, then one needs to select not more than three top-scoring products which contribute approximately 0.157×0.8=0.1256 to the total recommendation score. Since three top-ranking products contribute 0.1048 and four top-ranking products contribute 0.1308, the 80% boundary lies somewhere between rank 3 and rank 4. In this example, products with IDs: 8, 7 and 2 may be selected.

Machine Learning Formulation

Machine learning methods may be used to train one or more models to approximate the above-described signal weights $W_a$ and $W_p$. For example, pointwise, pairwise, and listwise methods—or the like—may be used for training ranking models based on input features per product per session, and the customer behavior associated with that session, such as product views, adding products to the shopping bag (ATB), and purchasing the products. Such ranking models have been used to build upon internal product scoring models. Product scores obtained from the internal scoring models are then used as inputs into the ranking objective function. For example, in a pairwise ranking model there may be an internal product scoring model, producing internal scores for the two products in a pair: a positive example, selected by a customer, and a negative example, not selected by the same customer. The objective of the ranking model is to maximize the score difference between the positive and negative examples.

Training a ranking model may update the internal scoring model as well.

The scores output by the scoring model may also be directly used for ranking products by sorting the products in the descending order of their scores. In this case the scoring model and the ranking model is the same model. It is trained to predict the score of any product given its features, i.e. it is trained pointwise.

Accordingly, a method is described for computing product features from the product and attribute recommendation signals, and two methods of computing recommendation signal weights assuming pointwise training for direct score-based ranking.

Product Feedback Based Scoring Model

Given the formula (2a) for S[p, 1], definitions for $\mathcal{S}_1$, $\mathcal{F}_p$, and $\mathcal{F}_{a1}$ can be obtained by the following substitutions:

$$\mathcal{S}_1(f,g) = f \times g$$

$$\mathcal{F}_p(\phi_p(Q), W_p)[p,1] = B_{\in}[p,1] = \hat{Q}_{\in}[p, \mathcal{E}_p] \cdot \mathcal{W}_p [\mathcal{E}_p, 1]$$

$$\mathcal{F}_{a1}(\phi_{a1}(P,M,R), W_a)[p,1] = (P|M)_{\in}[p,n] \cdot U[n, r_a] \cdot \mathcal{E}_p [\mathcal{F}_a, 1] \quad (24a\text{-}24c)$$

wherein $\mathcal{S}_1$ is composition via element-wise multiplication.

As shown below in (25a) and (25b), the feature matrixes for all products in P are parts of $\mathcal{F}_p$ and $\mathcal{F}_{a1}$, which are independent of the signal weights:

$$\phi_p[p, r_p] = \hat{Q}[p, \mathcal{E}_p] \quad (25a)$$

$$\phi_{a1}[p, r_a] = (P|M)_{\in}[p,n] \cdot U[n, r_a] \quad (25b)$$

Since both $\phi_p$ and $\phi_{a1}$ are product-based matrixes, they can be concatenated to obtain the full matrix of product features:

$$\phi[p, r] = \phi_p[p, r_p] \cup \phi_{a1}[p, r_a], \text{ where } r = r_p + r_a \quad (26)$$

In order to apply signal weights to the full feature matrix of dimension r, the weight vectors must also be extended by concatenating with zero vectors:

$$W_p[r,1] = \mathcal{W}_p[\mathcal{E}_p, 1] \cup 0[r_a, 1] \quad (27a)$$

$$W_a[r,1] = 0[r_p, 1] \cup \mathcal{E}_p[\mathcal{F}_a, 1] \quad (27b)$$

In the new notation, the following is obtained:

$$S[p,1] = (\phi[p,r] \cdot W_p[r,1]) \times (\phi[p,r] \cdot W_a[r,1]) \quad (28)$$

S[p, 1] is therefore a quadratic function with unknown weights $W_p$ and $W_a$. S[p, 1] computes the scores of products, and $\phi[p, r]$ represents product features.

A non-linear scoring model may be learned by incorporating it into a ranking model trained on product features $\phi$:

$$S(\phi)[p,1] \approx \text{nonlinear\_model}(\phi[p,r]) \quad (29)$$

Referring back to the example described above, using the sample data used in the example, feature vectors $\phi[p=10, r=2+3=5]$ for all products may be calculated as follows:

| Product ID | $\phi(i, 1)$ | $\phi(i, 2)$ | $\phi(i, 3)$ | $\phi(i, 4)$ | $\phi(i, 5)$ |
|---|---|---|---|---|---|
| 1 | 0 | 0 | 0.375 | 0.4089 | 0.0667 |
| 2 | 0 | 0.6667 | 0.125 | 0.1284 | $4*10^{-12}$ |
| 3 | 0 | 0 | 0.375 | 0.4242 | 0.0667 |
| 4 | 0 | 0 | 0.125 | 0.1284 | $4*10^{-12}$ |
| 5 | 0.3333 | 0 | 0.125 | 0.2756 | 0.0667 |
| 6 | 0.2667 | 0 | 0.125 | 0.2909 | 0.0667 |
| 7 | 0.2 | 0 | 0.375 | 0.2724 | 0.2667 |
| 8 | 0.1333 | 0.3333 | 0.125 | 0.2006 | 0.2667 |
| 9 | 0.0667 | 0 | 0.125 | 0.2534 | 0.0667 |
| 10 | 0 | 0 | 0.125 | 0.1065 | 0.6667 |

For example, the vectors of five numbers (rows in the above table) may be calculated for each product in the search result set from the recommendation signals collected from several recommendation systems. When a customer clicks on (e.g., adds to bag, purchases, etc.) one of the products from the results page, the five numbers associated with this product may be logged in the clickstream event log. This log may be used as an input into training of the ML model.

Linear Formulation

The formulation $S(\phi) \approx \text{nonlinear\_model}(\phi)$, where S are product scores and $\phi$ are product features, is the generic formulation for a pointwise learn to rank problem. Different training methods for such a nonlinear model may be used—such as, nonlinear regression, kernel SVMs, decision trees, neural networks, and the like.

The disadvantage of such training methods is that weight vectors $W_a$ and $W_p$ are not directly computed and, therefore, Attribute Ranking approaches described below cannot be used.

Because product features $\phi[p, r]$ are not generic product features, but already personalized recommendation signals, the equation for S[p, 1] may be restated as a linear regression problem:

$$\Phi[p, \tilde{r}] = \text{transform\_features}(\phi[p, r]) \quad (30)$$

(number of features $\tilde{r}$ in the linear model may differ from the number of recommendation signals r)

$$S(\phi)[p,1] = \Phi[p, \tilde{r}] \cdot W[\tilde{r}, 1] \approx \text{linear\_model}(\Phi[p, \tilde{r}]) \quad (31)$$

Examples of linear models are mean squared error (MSE) regression and support vector machine (SVM) with linear kernel. Linear models are known to be unable to capture complex nuance of feature relationships as well as, for example, decision trees can. However, if recommendation signals are well-selected for relevance, this complex nuance may not be necessary.

Based on valid transformed features, the following point-wise training discipline using a linear model may be used:

1. Sample product view, add-to-bag (ATB), and purchase events $p_t^*$ across sessions in the training period, for example, the previous day. Training period and sampling strategy are hyperparameters of the model training.

2. Apply heuristic relevance model (HRM) to the sampled events. HRM should assign target relevance to every sampled event:

$$S_t[p_t^*,1]=\text{estimate\_relevance}(p_t^*)>0 \tag{32}$$

For example: for every product view event i, assign score $S_t(i)=0.3$; for every ATB event, assign score $S_t(i)=0.7$; for every purchase event, assign score $S_t(i)=1.0$.

3. For every session with one or more assigned $S_t(i)>0$, sample those products which were shown above the products with assigned $S_t(i)>0$, but which customer did not view. Assign $S_t(j)=0$ to sampled events. Number of sampled products and sampling strategy are hyperparameters of the model training.

4. Based on the session data from the gathered events, compute product feature matrix $\phi[p_t^*, r]$.

5. There may be events where some recommenders did not produce signal greater than $\epsilon$ for some products or produced the same signal value for many products. Such events are less valuable for learning the model weights. Thus, the target number of training samples $p_t$ is selected and only the best $p_t$ events are kept:

$$\phi[p_t,r]=\text{remove\_irrelevant\_rows}(\phi[p_t^*,r]) \tag{33}$$

6. Scores $S_t(i)$ assigned to every event which passed the filter define target scores vector $S_t[p_t, 1]$.

7. Transform features to make them compatible with linear models (number of features $\tilde{r}$ in a linear model may differ from the number of recommendation signals r):

$$\Phi[p_t,\tilde{r}]=\text{transform\_features}(\phi[p_t,r]) \tag{34}$$

Use a linear model to directly estimate the weights $\mathcal{W}[\tilde{r}, 1]$.

For example, normal equation for linear regression with regularization term α allows to compute the weights as follows:

$$W[\tilde{r},1]=(\Phi^T[\tilde{r},p_t]\cdot\Phi[p_t,\tilde{r}]++\Pi[\tilde{r},\tilde{r}])^{-1}\cdot\Phi^T[\tilde{r},p_t]\cdot S[p_t,1] \tag{35}$$

SVM with a linear kernel also allows for directly computing the weights using quadratic programming methods.

9. Use the computed weights in product scoring until the next time the weights are recomputed.

10. Incremental weight updates may be computed via the gradient of a loss function used to train the linear model.

For example, for mean squared error (MSE) regression and learning rate η:

$$\nabla MSE_s(W[\tilde{r}, 1]) = \frac{2}{p_t}\phi^T[\tilde{r}, p_t]\cdot(\phi[p_t, \tilde{r}]\cdot W[\tilde{r}, 1] - S_t[p_t, 1]) \tag{36a}$$

$$W_{new}[\tilde{r}, 1] = (1 - \alpha\eta)W[\tilde{r}, 1] - \eta\nabla MSE_S[\tilde{r}, 1] \tag{36b}$$

Linear SVM gradients can be similarly applied.

11. For online learning of weights, gradients can be periodically applied between full weight recalculations.

12. Live ranking application first computes product features $\phi[p, r]$, then applies feature transformation to obtain $\Phi[p, \tilde{r}]$, then applies computed weights $W[\tilde{r}, 1]$ to obtain product scores $S[p, 1]$.

Sparse Features Problem

Features $\phi[p_t, r]$ are obtained from black-box recommendation signals. The quality of these signals may vary. Some signals may be present only for a few products, and some signals may produce the same value for many products. It is, thus, necessary to determine a way to implement equation (33) from step 5 described above.

If a signal value is negligible ($\epsilon$) or a signal value is the same (similar, within tolerance) for a group of products, applying any weight to such a signal would not differentiate these products' ranks. Therefore, it is only necessary to compute the weight of such a signal based on events where it's neither negligible nor same for all products.

Given a raw training set of product events $p_t^*$, the task is to identify $p_t \subseteq p_t^*$, where features $\phi[p_t, r]$ are most informative for signal weights calculation. According to an exemplary embodiment, the approach is to consider the rarity of each signal, and the strength of signals per product. The common approach to score items (in this case product events $p_t^*$) with respect to the signal rarity and strength is TF-IDF.

To compute TF-IDF ranks for the product set $p_t^*$, it would be necessary to convert matrix $\phi[p_t^*, r]$ into a term matrix. The conversion is performed by an element-wise function:

$$\tilde{\phi}[p_t^*, r] = \text{as\_term}(\phi[p_t^*, r]) \tag{37}$$

$$\text{standardize}(\phi(i, j)) = \frac{\phi(i, j) - \text{mean}(\phi(j))}{1.0 + \text{std}(\phi(j))} \tag{38}$$

$$\phi_{std}[p_t^*, r] = \text{standardize}(\phi[p_t^*, r]) \tag{39}$$

$$\text{as\_term}(\phi(i, j)) = \begin{cases} \epsilon, & \phi(i, j) \le \epsilon \\ \text{round}(\phi_{std}(i, j) * g), & \phi(i, j) > \epsilon \end{cases} \tag{40}$$

where g is the granularity hyperparameter, std is the standard deviation, round is the scalar function rounding to the nearest integer.

According to an exemplary embodiment, g is selected by:

$$g = \frac{1}{\min(\text{abs}(\phi_{std}(i, j), \forall 1 \le i \le p_t^*, \forall 1 \le j \le r : \phi_{std}(i, j) \ne 0)} \tag{41}$$

Then, a list of all unique terms in the term matrix is built:

$$T[1,u]=\text{unique\_elements}(\tilde{\phi}[p_t^*,r]) \tag{42}$$

An inverse document frequency (IDF) vector is computed as follows:

$$idf(\tilde{\phi})[1, u] = \bigcup_{k=1}^{u}\left(1 + \ln\frac{p_t^*}{1 + \sum_{i=1}^{p_t^*}\sum_{j=1}^{r}\begin{cases} 1, & \tilde{\phi}(i, j) = T(k) \\ 0, & \tilde{\phi}(i, j) \ne T(k) \end{cases}}\right) \tag{43}$$

Row-wise TF-IDF scores for every product in is computed by summing IDF scores of every term in every row:

$$tfidf(\tilde{\phi})[p_t^*, 1] = \bigcup_{i=1}^{p_t^*} \left( \sum_{j=1}^{r} \sum_{k=1}^{u} \begin{cases} idf(\tilde{\phi})(k), & \tilde{\phi}(i,j) = T(k) \\ 0, & \tilde{\phi}(i,j) \neq T(k) \end{cases} \right) \quad (44)$$

The subset $\phi[p_t, r] \subseteq \phi[p_t, r]$ can be selected as those rows of $\phi[p_t, r]$ that have the highest scores in tfidf $(\tilde{\phi})[p_t^*, 1]$.

Thus, the algorithm described in this section may be denoted as:

$$\phi[p_t, r] = \text{tfidf\_rank}(\phi[p_t^*, r], g) \quad (45)$$

Referring back to the example described above, using the sample data used in the example, term matrix as_term($\phi$) [10,5] is calculated for all products, taking a granularity constant g=100:

| Product ID | $\tilde{\phi}(i,1)$ | $\tilde{\phi}(i,2)$ | $\tilde{\phi}(i,3)$ | $\tilde{\phi}(i,4)$ | $\tilde{\phi}(i,5)$ |
|---|---|---|---|---|---|
| mean($\phi$(j)) | 0.1 | 0.1 | 0.2 | 0.2489 | 0.1534 |
| std($\phi$(j)) | 0.1202 | 0.2134 | 0.1146 | 0.1054 | 0.1933 |
| 1 | $10^{-12}$ | $10^{-12}$ | 16 | 14 | $-7$ |
| 2 | $10^{-12}$ | 47 | $-7$ | $-11$ | $-13$ |
| 3 | $10^{-12}$ | $10^{-12}$ | 16 | 16 | $-7$ |
| 4 | $10^{-12}$ | $10^{-12}$ | $-7$ | $-11$ | $-13$ |
| 5 | 21 | $10^{-12}$ | $-7$ | 3 | $-7$ |
| 6 | 15 | $10^{-12}$ | $-7$ | 4 | $-7$ |
| 7 | 9 | $10^{-12}$ | 16 | 2 | 9 |
| 8 | 3 | 19 | $-7$ | $-4$ | 9 |
| 9 | $-3$ | $10^{-12}$ | $-7$ | 0 | $-7$ |
| 10 | $10^{-12}$ | $10^{-12}$ | $-7$ | $-13$ | 43 |

IDF vector of unique terms are obtained from the term matrix:

| T(k) | IDF(k) |
|---|---|
| $10^{-12}$ | 0.66 |
| $-13$ | 1.92 |
| $-11$ | 2.20 |
| $-7$ | 0.74 |
| $-4$ | 2.61 |
| $-3$ | 2.61 |
| 0 | 2.61 |
| 2 | 2.20 |
| 3 | 2.61 |
| 4 | 2.61 |
| 9 | 1.92 |
| 14 | 2.61 |
| 15 | 2.61 |
| 16 | 1.69 |
| 19 | 2.61 |
| 21 | 2.61 |
| 43 | 2.61 |
| 47 | 2.61 | tfidf($\tilde{\phi}$) are obtained by summing IDF values of unique terms rowwise:

| Product ID | TFIDF ($\tilde{\phi}$)(i) | Rank |
|---|---|---|
| 1 | 6.37 | 7 |
| 2 | 8.13 | 3 |
| 3 | 5.45 | 9 |
| 4 | 6.18 | 8 |
| 5 | 6.95 | 5 |
| 6 | 7.36 | 4 |
| 7 | 8.39 | 2 |
| 8 | 10.48 | 1 |
| 9 | 7.36 | 4 |
| 10 | 6.59 | 6 |

For $p_t=5$, rows 8, 7, 2, 6, and 9 are selected.

Linear Formulation for Product-Based Pointwise Training

Based on the scoring function being quadratic, a polynomial feature extraction is applied to obtain a linear model:

$$s[p,1] = \bigcup_{k=1}^{p}\left(\sum_{i=1}^{r}\phi(k,i)W_p(i) * \sum_{j=1}^{r}\phi(k,j)W_a(j)\right) \quad (46)$$

$$= \bigcup_{k=1}^{p}\sum_{i=1}^{r}\sum_{j=1}^{r}(\phi(k,i)\phi(k,j))*(W_p(i)W_a(j))$$

$$= \bigcup_{k=1}^{p}(\phi(k)\otimes\phi(k))\cdot(W_p\otimes W_a)$$

From this, the feature transformation function is obtained:

$$\Phi[p, r^2] = \text{transform\_features}(\phi[p,r]) = \bigcup_{k=1}^{p}\phi(k)\otimes\phi(k) \quad (47)$$

Accordingly, pointwise training discipline can be applied, as described above. A disadvantage of this formulation is that, even though it allows a linear model to be trained, its weights would be:

$$W = W_p \otimes W_a \quad (48)$$

The above would not allow for determining $W_p$ and $W_a$ used in attribute scoring. Thus, two linear models may be built, instead of a single model, in order to access weights $W_p$ and $W_a$.

Linear Formulation for Attribute-Based Pointwise Training

Based on (2b), (3a) and (3c), the product scores S[p, 1] may be represented in a different way:

$$S[p,1] = \mathcal{S}_2(\mathcal{F}_p(\phi_p(Q), W_p)[p,1], \mathcal{F}_{a2}(\phi_{a2}(P,M,R), W_a)[n,1]) \quad (49)$$

Given the definitions of $\phi_p$ and $\mathcal{F}_p = B \in [p, 1]$ computed so far, the remaining definitions can be obtained by the following substitutions:

$$\mathcal{S}_2(f,g) = f \times ((P|M)_\in;g)$$

$$\mathcal{F}_{a2}(P,M,R,W_a)[n,1] = U[n,r_a] \cdot \mathcal{W}_a[\mathcal{F}_a, 1]$$

$$\phi_{a2}[n,r_a] = U[n,r_a] \quad (50a\text{-}50c)$$

wherein $\mathcal{S}_2$ is composition via element-wise multiplication of the argument f and the modified argument g.

$\mathcal{F}_{a2}(\phi_{a2})$ is, therefore, a linear function with unknown weights $W_a$, so that the modified pointwise training discipline can be applied to train a linear model:

$$\mathcal{F}_{a2}(\phi_{a2}) \approx \text{linear\_model}(\phi_{a2}) \quad (51)$$

In the attribute-based approach, a scoring model is defined to act not on the products but on the product attributes. $\mathcal{F}_{a2}(\phi_{a2})$ computes the scores of product attributes, and vector $\phi_{a2}$ represents the input features.

The modification to the pointwise training discipline described above considers product attribute selection events instead of product selection events. Every product view, ATB, and purchase event can be converted into attribute selection events for all the selected product's attribute values. Additionally, facet selection events may be considered. HRM for attribute selection events should assign higher relevance to those attribute values that contributed to a customer's progress through the shopping funnel.

For example: a customer searches for "jeans"; then filters search results on brand "Calvin Klein" and applies additional filters on color "blue" and size "small"; views five products, then adds two of them to the shopping bag, and purchases one.

The attribute HRM should increase the target relevance score of BRAND="Calvin Klein" based on the following factors:

It was the facet filter applied in 3 keyword search events in the same session.
It was the attribute value of five viewed products.
It was the attribute value of two products added to bag.
It was the attribute value of a purchased product.

After $\mathcal{F}_{a2}$ approximation model has been trained, its predictions for every possible attribute value can be used to obtain product features for the second linear model. From this, the feature transformation function is obtained:

$$\Phi[p, r_p] = \text{transform\_features}(\phi[p, r]) \quad (52)$$
$$= \phi_p[p, r_p] \times ((P|M)_\epsilon[p, n] \cdot \mathcal{F}_{a2}(\phi_{a2}[p, r_a])[n, 1])$$

Thus, pointwise training discipline may be applied as described above. The first linear model provides the weights $W_a$, which are required for attribute ranking, and the second model provides the weights $W_p$.

Referring back to the example described above, attribute-based features $\phi_{a2}[n, r_a]$ have already been calculated above (see U[20, 3] above):

| Attribute Value | $\phi_{a2}(1)$ | $\phi_{a2}(2)$ | $\phi_{a2}(3)$ |
|---|---|---|---|
| Shoes | $10^{-12}$ | 0.06 | $10^{-12}$ |
| Pants | $10^{-12}$ | 0.06 | $10^{-12}$ |
| Dress | $10^{-12}$ | 0.06 | $10^{-12}$ |
| Blender | $10^{-12}$ | 0.02 | $10^{-12}$ |
| Nike | $10^{-12}$ | 0.125 | 0.0667 |
| Adidas | 0 | 0 | 0 |
| Billabong | $10^{-12}$ | 0.05 | 0.2667 |
| Kitchenaid | $10^{-12}$ | 0.025 | 0.6667 |
| Black | 0.125 | 0.0462 | $10^{-12}$ |
| White | 0.125 | 0.0615 | $10^{-12}$ |
| Red | 0.125 | 0.0462 | $10^{-12}$ |
| Blue | 0.125 | 0.0462 | $10^{-12}$ |
| Leather | $10^{-12}$ | 0.0444 | $10^{-12}$ |
| Suede | $10^{-12}$ | 0.0222 | $10^{-12}$ |
| Denim | $10^{-12}$ | 0.0222 | $10^{-12}$ |
| Chino | $10^{-12}$ | 0.0444 | $10^{-12}$ |
| Silk | $10^{-12}$ | 0.0444 | $10^{-12}$ |
| Nylon | $10^{-12}$ | 0.0222 | $10^{-12}$ |
| Oxford | 0.25 | 0.1333 | $10^{-12}$ |
| Maxi | 0.25 | 0.0667 | $10^{-12}$ |

When a customer applies a facet refinement—views, ATBs, or purchases a product—the three numbers associated with the refinement, or the product attribute values, may be logged in the clickstream event log. This log may be used as an input into training of the ML model.

Referring back to the example described above, the product features have already been calculated (see φ(1) and φ(2) above). The additional feature component $(P|M)_\epsilon \cdot \mathcal{F}_{a2}(\phi_{a2})$ may be calculated based on the output of the facet value scoring model. For example, a linear approximation of $\mathcal{F}_{a2}(\phi_{a2})$ has been trained, which learned the following $W_a[3, 1]=(0.25, 0.25, 0.5)$:

| Attribute Value | $\approx \mathcal{F}_{a2}$ |
|---|---|
| Shoes | 0.015 |
| Pants | 0.015 |
| Dress | 0.015 |
| Blender | 0.005 |
| Nike | 0.0646 |
| Adidas | 0 |
| Billabong | 0.1459 |
| Kitchenaid | 0.3396 |
| Black | 0.0428 |
| White | 0.0467 |
| Red | 0.0428 |
| Blue | 0.0428 |
| Leather | 0.0111 |
| Suede | 0.0056 |
| Denim | 0.0056 |
| Chino | 0.0111 |
| Silk | 0.0111 |
| Nylon | 0.0056 |
| Oxford | 0.0958 |
| Maxi | 0.0792 |

Finally, the following transformed product features are obtained in this example:

| Product ID | $(P|M)_\epsilon \cdot \mathcal{F}_{a2}(\phi_{a2})$ | $\Phi(i,1)$ | $(\Phi i,2)$ |
|---|---|---|---|
| 1 | 0.2293 | 0 | 0 |
| 2 | 0.0634 | 0 | 0.0423 |
| 3 | 0.2332 | 0 | 0 |
| 4 | 0.0634 | 0 | 0 |
| 5 | 0.1335 | 0.0445 | 0 |
| 6 | 0.1373 | 0.0366 | 0 |
| 7 | 0.2952 | 0.0590 | 0 |
| 8 | 0.2148 | 0.0286 | 0.0716 |
| 9 | 0.1280 | 0.0085 | 0 |
| 10 | 0.3912 | 0 | 0 |

When a customer clicks on (e.g., adds to bag, purchases, etc.) one of the products from the results page, the two numbers associated with this product may be logged in the clickstream event log. This log may be used as an input into training of the ML model.

Derivation of Attribute Scoring Function $\mathcal{A}$

As shown above in (4), $\mathcal{F}_{a2}$ represents the vector of attribute value scores V[n, 1]

$$V[n,1]U[n,r_a] \cdot W_a[\mathcal{F}_a, 1] \quad (53)$$

Given the attribute value scores V[n, 1], the attribute scores can be obtained by summing each block:

$$\mathcal{A}(V) = A[a,1]M[a,n] \cdot V[n,1] \quad (54)$$

Referring back to the example described above, the attribute value scores have already been calculated:

| Attribute Value | $V = U \cdot \hat{W}_a$ |
|---|---|
| Shoes | 0.02 |
| Pants | 0.02 |
| Dress | 0.02 |
| Blender | 0.0067 |

-continued

| Attribute Value | $V = U \cdot \hat{W}_a$ |
|---|---|
| Nike | 0.0639 |
| Adidas | 0 |
| Billabong | 0.1056 |
| Kitchenaid | 0.2306 |
| Black | 0.0571 |
| White | 0.0622 |
| Red | 0.0571 |
| Blue | 0.0571 |
| Leather | 0.0148 |
| Suede | 0.0074 |
| Denim | 0.0074 |
| Chino | 0.0148 |
| Silk | 0.0148 |
| Nylon | 0.0074 |
| Oxford | 0.1278 |
| Maxi | 0.1056 |

From these attribute value scores, attribute scores may be obtained as follows:

| Attribute | A |
|---|---|
| TYPE | 0.0667 |
| BRAND | 0.4000 |
| COLOR | 0.2334 |
| MATERIAL | 0.0666 |
| STYLE | 0.2333 |

For example, when attributes and attribute values are presented to the customer in selectable facets, the attribute and attribute value ranks may be selected naively based on the scores A and V, so that highest score corresponds to lowest (i.e., most important) rank.

In embodiments, two other ranking strategies may be more useful for guiding the customer to a certain goal: cumulative and discriminative attribute ranking.

Attribute Ranking

Given the product scores S[p, 1], attribute value scores V[n, 1], attribute scores A[a, 1], and attribute metadata M[a, n], the problem of ranking is the problem of finding a hierarchical ranking function (see Appendix below) which would produce a vector of attribute value ranks (or indexes) I[n, 1].

With this notation, the problem of ranking attribute values is the problem of finding the following function $\mathfrak{I}_S$:

$$\mathfrak{I}_S(V[n,1], M[a,n], \text{ORDER}) = I[n,1] \quad (55)$$

In accordance with an exemplary embodiment of the present invention, there may be at least two possible approaches to ranking attribute values: cumulative and discriminative.

In cumulative ranking approach, one may seek the most relevant filter for the entire result set, so that narrowing by this filter leaves overall more relevant products than before applying the filter.

In discriminative ranking approach, one may seek a filter which would increase the score difference between the two given subsets of the search result, e.g. between the top two products.

Cumulative Attribute Ranking

In accordance with an exemplary embodiment of the present invention, a goal may be set to find the most "important" attribute value, removal of which from the computation of product scores reduces the cumulative relevance of the product set by the highest margin. The total score of the product set is defined as the cumulative gain (CG) of the product set. The attribute with the highest contribution to the overall score will reduce the score by the largest number when removed from the calculations, so it will be the attribute which decreases the CG the most when removed from the calculations.

The scores of attribute values are defined by the vector V[n, 1], and their total contribution to product scores may be calculated by element-wise vector multiplication, as shown below in (56):

$$S[p,1] = ((P \mid M)_\epsilon[p,n] \cdot V[n,1]) \times B_\epsilon[p,1] = \quad (56)$$

$$((P \mid M)_\epsilon[p,n] \times B_\epsilon[p,1]) \cdot V[n,1] \xRightarrow{\text{per-value}}$$

$$V[n,1] \times \sum_p ((P \mid M)_\epsilon[p,n] \times B_\epsilon[p,1])^T[n,p]$$

Thus, for ranking based on maximum contribution, the vector of attribute value ranks I[n, 1] can be expressed as:

$$I[n,1] = \text{hi\_sort} \quad (57)$$

$$\left( V[n,1] \times \sum_p ((P \mid M)_\epsilon[p,n] \times B_\epsilon[p,1])^T[n,p], M[a,n], \text{DESC} \right)$$

Based on the example described above, the following table illustrates exemplary comparison between naïve and cumulative attribute value ranks:

| Attribute Value | V | $\sum_p ((P \mid M)_\epsilon \times B_\epsilon)^T$ | $V \times \sum_p ((P \mid M)_\epsilon \times B_\epsilon)^T$ | Naïve In-Block-Rank | Cumulative In-Block-Rank |
|---|---|---|---|---|---|
| Shoes | 0.02 | 0.3333 | 0.0067 | 1 | 2 |
| Pants | 0.02 | 0.3 | 0.006 | 1 | 3 |
| Dress | 0.02 | 0.3666 | 0.0073 | 1 | 1 |
| Blender | 0.0067 | $2*10^{-12}$ | $0.0133*10^{-12}$ | 2 | 4 |
| Nike | 0.0639 | 0.3333 | 0.213 | 3 | 2 |
| Adidas | 0 | 0.3333 | 0 | 4 | 4 |
| Billabong | 0.1056 | 0.3333 | 0.0352 | 2 | 1 |
| Kitchenaid | 0.2306 | $2*10^{-12}$ | $0.4611*10^{-12}$ | 1 | 3 |
| Black | 0.0571 | 0.4 | 0.0228 | 2 | 1 |
| White | 0.0622 | 0.1666 | 0.0104 | 1 | 3 |
| Red | 0.0571 | 0.3666 | 0.0209 | 2 | 2 |
| Blue | 0.0571 | 0.0666 | 0.0038 | 2 | 4 |
| Leather | 0.0148 | $3*10^{-12}$ | $0.0444*10^{-12}$ | 1 | 5 |
| Suede | 0.0074 | 0.3333 | 0.0025 | 2 | 3 |
| Denim | 0.0074 | $2*10^{-12}$ | $0.0148*10^{-12}$ | 2 | 6 |

-continued

| Attribute Value | V | $\sum_{p}((P\|M)_\epsilon \times B_\epsilon)^T$ | $V \times \sum_{p}((P\|M)_\epsilon \times B_\epsilon)^T$ | Naïve In-Block-Rank | Cumulative In-Block-Rank |
|---|---|---|---|---|---|
| Chino | 0.0148 | 0.3 | 0.0044 | 1 | 2 |
| Silk | 0.0148 | 0.3333 | 0.0049 | 1 | 1 |
| Nylon | 0.0074 | 0.0333 | 0.0002 | 2 | 4 |
| Oxford | 0.1278 | $3*10^{-12}$ | $0.3833*10^{-12}$ | 1 | 2 |
| Maxi | 0.1056 | 0.1 | 0.0106 | 2 | 1 |

In addition, based on the example described above, the following table illustrates exemplary comparison between naïve and cumulative attribute ranks:

| Attribute Value | A (V) | $\mathcal{A}\left(V \times \sum_{p}((P\|M)_\epsilon \times B_\epsilon)^T\right)$ | Naïve Rank | Cumulative Rank |
|---|---|---|---|---|
| TYPE | 0.0667 | 0.02 | 4 | 3 |
| BRAND | 0.4000 | 0.0565 | 1 | 2 |
| COLOR | 0.2334 | 0.058 | 2 | 1 |
| MATERIAL | 0.0666 | 0.0121 | 5 | 4 |
| STYLE | 0.2333 | 0.0106 | 3 | 5 |

Discriminative Attribute Ranking

In accordance with an exemplary embodiment of the present invention, two groups of products $p_1$ and $p_2$ are selected from p based on their scores in S[p, 1]:

$$P_1[p_1,n] \cup P_2[p_2,n] \subseteq P[p,n], p_1+p_2 \leq p \quad (58)$$

Examples of such two groups of products include, but are not limited to: first and second scoring products; first and last scoring products; top half and bottom half scoring products; top x and bottom x scoring products, etc. With these two groups of products, their group scores can be defined. Since group scores are calculated, there is no need to track scores of individual products in each group. As such group vectors are defined as shown below in (59a, 59b):

$$G_1[1, n] = \left(\sum_{p_1} \mathcal{F}_{p_1}[p_1, 1]\right)[1, 1] \times \left(\sum_{p_1} (P \mid M)_{\epsilon_1}[p_1, n]\right)[1, n]$$

$$G_2[1, n] = \left(\sum_{p_2} \mathcal{F}_{p_2}[p_2, 1]\right)[1, 1] \times \left(\sum_{p_2} (P \mid M)_{\epsilon_2}[p_2, n]\right)[1, n] \quad (59a, 59b)$$

The corresponding group scores can be obtained as shown below in (60a, 60b):

$$S_1[1,1] = G_1[1,n] \cdot V[n,1]$$

$$S_2[1,1] = G_2[1,n] \cdot V[n,1] \quad (60a, 60b)$$

The goal of the discriminative ranking is to increase the difference of these scores:

$$d = S_1 - S_2, \text{ where } S_1 \geq S_2 \quad (61)$$

In accordance with an exemplary embodiment of the present invention, individual attribute contribution to the score difference is maximized. In order to maximize the score difference:

$$d = S_1 - S_2 = G_1[1,n] \cdot V[n,1] - G_2[1,n] \cdot V[n,1] \quad (62)$$

the following (63) must be maximized by removing only one term from this sum:

$$(G_1[1, n] - G_2[1, n]) \cdot V[n, 1] =$$
$$\Delta G[1, n] \cdot V[n, 1] = \sum_{i=1}^{n} (G_1(i) - G_2(i)) * V(i) \quad (63)$$

Removing the smallest term (which may be a negative value) will maximize the remaining sum. The expression $(G_1-G_2)^T[n, 1] \times V[n, 1]$ gives the vector of terms of the above sum.

Because the smallest term is required to produce the highest rank, it is necessary to rank the values in ascending (ASC) order. However ASC order would rank the highest those attribute values which are not present in any of the products or not recommended by any of the recommenders. So it may be necessary to modify the vector of terms of the above sum to meet the following criteria:

(a) Attribute values with zeros in V[n, 1] should be ranked last, as in:

$$I[n,1] = \text{hi\_sort}(V[n,1], M[a,n], \text{DESC}), \quad (64)$$

(b) Given that both $G_1[1, n]$ and $G_2[1, n]$ have no zero elements, the rest of the attribute values with non-zeros in V[n, 1] should be ranked in ASC order of the sum's terms (which may be negative). To convert the sorting order to descending (DESC), ΔG must be normalized so that the elements of 1[n, 1]−$\overline{\Delta G}$ are in range [0,2]:

$$I[n,1] = \text{hi\_sort}(V[n,1] \times (1[n,1] - \overline{\Delta G}^T)[n,1], M[a,n], \text{DESC}) \quad (65)$$

The above three strategies may be combined by using the vector ε[n, 1] to facilitate tie-break:

$$I[n,1] = \text{hi\_sort}(V[n,1] \times (1+\varepsilon - \overline{\Delta G}^T)[n,1], M[a,n], \text{DESC}) \quad (66)$$

To compute discriminative ranks, it may be necessary to first decide on product groupings $p_1$ and $p_2$. For example, let's assume that a goal is to find such attribute values which improve the score of the top half of the search results ($p_1$) relative to the score of the bottom half of the search result ($p_2$). Referring back to the example described above, where the product ranks have been calculated as follows:

| Product ID | Rank |
|---|---|
| 1 | 9 |
| 2 | 3 |
| 3 | 8 |
| 4 | 10 |
| 5 | 4 |
| 6 | 5 |
| 7 | 2 |
| 8 | 1 |
| 9 | 6 |
| 10 | 7 |

Based on these ranks, the top half consists of products $p_1=\{8, 7, 2, 5, 6\}$, and bottom half consists of products $p_2=\{9, 10, 3, 1, 4\}$.

Delta group vector can be calculated as follows, using (67):

$$\Delta G[1, n] = \left(\sum_{p_1} B_\epsilon\right)[1, 1] \times \left(\sum_{p_1} (P \mid M)_\epsilon\right)[1, n] - \left(\sum_{p_2} B_\epsilon\right)[1, 1] \times \left(\sum_{p_2} (P \mid M)_\epsilon\right)[1, n] \quad (67)$$

| Attribute Value | $\Delta G^T$ | $1 + \varepsilon - \hat{\Delta G}^T)$ | V | $V \times (1 + \varepsilon - \hat{\Delta G}^T)$ | Naïve In-Block-Rank | Cumulative In-Block-Rank | Discriminative In-Block-Rank |
|---|---|---|---|---|---|---|---|
| Shoes | 0.9 | 0.9553 | 0.02 | 0.0191 | 1 | 2 | 1 |
| Pants | 1.9 | 0.9056 | 0.02 | 0.0181 | 1 | 3 | 2 |
| Dress | 1.9 | 0.9056 | 0.02 | 0.0181 | 1 | 1 | 2 |
| Blender | −0.0333 | 1.0017 | 0.0067 | 0.0067 | 2 | 4 | 3 |
| Nike | 1.8333 | 0.9089 | 0.0639 | 0.0581 | 3 | 2 | 3 |
| Adidas | 0.9333 | 0.9536 | 0 | 0 | 4 | 4 | 4 |
| Billabong | 1.9332 | 0.9040 | 0.1056 | 0.0954 | 2 | 1 | 2 |
| Kitchenaid | −0.0333 | 1.0017 | 0.2306 | 0.2309 | 1 | 3 | 1 |
| Black | 1.9 | 0.9056 | 0.0571 | 0.0517 | 2 | 1 | 4 |
| White | 1.2222 | 0.9393 | 0.0622 | 0.0584 | 1 | 3 | 1 |
| Red | 1.2721 | 0.9368 | 0.0571 | 0.0535 | 2 | 2 | 3 |
| Blue | 0.2722 | 0.9865 | 0.0571 | 0.0563 | 2 | 4 | 2 |
| Leather | −0.0666 | 1.0033 | 0.0148 | 0.0148 | 1 | 5 | 1 |
| Suede | 0.9666 | 0.9520 | 0.0074 | 0.0070 | 2 | 3 | 4 |
| Denim | −0.0333 | 1.0017 | 0.0074 | 0.0074 | 2 | 6 | 3 |
| Chino | 1.9332 | 0.9040 | 0.0148 | 0.0134 | 1 | 2 | 2 |
| Silk | 1.9332 | 0.9040 | 0.0148 | 0.0134 | 1 | 1 | 2 |
| Nylon | −0.0333 | 1.0017 | 0.0074 | 0.0074 | 2 | 4 | 3 |
| Oxford | −0.0666 | 1.0033 | 0.1278 | 0.1282 | 1 | 2 | 1 |
| Maxi | 0.9666 | 0.9520 | 0.1056 | 0.1005 | 2 | 1 | 2 |

The following table illustrates comparison between naïve, cumulative ranks (already computed above) and discriminative attribute ranks computed in this example:

| Attribute Value | $\mathcal{A} (V \times (1 + \varepsilon - \hat{\Delta G}^T))$ | Naïve Rank | Cumulative Rank | Discriminative Rank |
|---|---|---|---|---|
| TYPE | 0.0620 | 4 | 3 | 5 |
| BRAND | 0.3845 | 1 | 2 | 1 |
| COLOR | 0.2198 | 2 | 1 | 3 |
| MATERIAL | 0.0635 | 5 | 4 | 4 |
| STYLE | 0.2287 | 3 | 5 | 2 |

Hybrid Attribute Ranking

The two ranking functions for cumulative and discriminating ranking methods can be combined with certain weights to achieve a hybrid ranking. For example, the two ranking functions may be combined by using a hybrid weight vector H[2,1] as shown below in (68):

$$I[n, 1] = \text{hi\_sort} \quad (68)$$
$$\left(\left(\left(V \times \sum_p ((P \mid M)_\epsilon \times B_\epsilon)^T\right)[n, 1] \cup \left(V \times (1 + \varepsilon - \hat{\Delta G}^T)\right)[n, 1]\right)\right.$$
$$\left.[n, 2] \cdot H[2, 1], M[a, n], ASC\right)$$

In embodiments, many signals can be used as attribute recommenders $R[n, r_a]$. All attribute recommenders may be divided in two families: personalized and non-personalized. Personalized attribute recommenders may require Customer Record ID as a mandatory input. Non-personalized recommenders may work generically.

Examples of personalized attribute recommenders may include, but not limited to:

Attribute Values corresponding to the known properties of the customer, e.g., age, gender, sizes etc.;

Attribute Values of Repeated Prior Purchases;

Attribute Values of products recommended based on the Prior Purchases;

Collaborative Shopping Model in an open source Machine Learning Server, such as PredictionIO; and Attribute Value (e.g., brand) Propensity models, for example, are machine learning models configured to predict the likelihood of a particular customer purchasing a particular brand within a certain period of time.

Examples of non-personalized attribute recommenders may include, but not limited to:

Facet and FacetValue ordering from a Merchandising Rule which is configured to be activated when its Trigger Condition is satisfied.

Facet and Facet Value with the highest product count in the search result.

In accordance with an exemplary embodiment, let's assume that there exists a predetermined association between some anchor attribute's values and some other attribute's recommended values, for example, an association between the values of PRODUCT_TYPE (e.g., "jeans," "shirts," "dresses," etc.) and the facets configured per PRODUCT_TYPE in one or more Merchandising Rules. This association may be used to compute a blended recommendation for the associated attribute values using percentages of the anchor attribute values (e.g., 30% jeans and 70% pants) in the result set.

Term frequency-inverse document frequency (TF-IDF) weighting scheme or other Keyword Search scoring of the search results based on the text index of the Facet Clicks or based on the text index of the Attributes of Purchased Products from the search logs.

Doc2vec (an extension of word2vec neural network models) or other Vector Retrieval scoring of the search results based on the vectorized index of the Facet Clicks or based on the vectorized index of the Attributes of Purchased Products from the search logs.

Confidence scoring of a Classification ML model (e.g., Tensorflow), trained to assign Attribute Values to the search phrase as Classification Labels, based on the Facet Clicks or based on the Attributes of Purchased Products from the search logs.

Keyword search of Facet Values based on matching keywords from an unsupervised ML topic (e.g., LDA); Topic corresponding to the search phrase to the keywords present in the Facet Values.

In embodiments, if it is not technically feasible to apply the MARLENE scoring algorithm to the entire search result, and reorder all products, the scoring may be limited to the top K results (e.g., typically around a few hundred results). To make sure that top K results are relevant to begin with, some of the attribute recommendations may be applied as pre-filters. Such pre-filters are called "Implicit Filters", and may, for example, be generated from the unchangeable attributes of the customer known from the user profile data, such as gender, age, and size.

In embodiments, many signals can be used as product recommenders $Q[p, r_p]$. All product recommenders may be divided into two families: personalized and non-personalized. Personalized product recommenders may require a Customer Record as a mandatory input. Non-personalized recommenders may work generically.

Examples of personalized product recommenders may include, but are not limited to:
  Repeated Prior Purchases;
  Recommendations based on the Prior Purchases; and
  Various (image, name, description, etc.) similarity scores based on the Prior Purchases.

Examples of non-personalized product recommenders may include, but are not limited to:
  Natural Relevancy Score;
  Weighted blend of various business metrics associated with products in the result set;
  Machine-learned recommendation score based on various business metrics associated with products in the result set; and
  Relevancy Score from a Vector Search Engine, such as a doc2vec index.

In embodiments, a search engine database's API may be used to compose a white list of facetable attributes, and their values.

In embodiments, depending on the configuration settings, a whitelist of only those attribute values which are present in the facets selected by the fired Merchandising Rule, may be required. Alternatively, those facet values may be used as an Attribute-Recommending signal with a heavy weight.

In the context of computing attribute value recommendations, the following use cases may require blacklisting:
  Those attributes which correspond to the unsupported use cases in some embodiments, such as PRICE (which requires bucketing);
  All attributes which are directly applied as implicit filters;
  All attributes which have been detected in the Search Phrase by the search phrase parser; and
  All attributes present in the facet filters.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in a non-transitory information carrier (e.g., in a machine readable storage device), or embodied in a propagated signal, for execution by, or to control the operation of, data processing apparatus (e.g., a programmable processor, a computer, multiple computers, to name a few). The subject matter described herein can be implemented in one or more local, cloud, and/or hybrid servers and/or one or more local, cloud, and/or hybrid databases. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit), to name a few.

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., erasable programmable read-only memory (EPROM), electrically erasable programmable read-only memory (EEPROM), and flash memory devices); magnetic disks, (e.g., internal hard disks or removable disks); magneto optical disks; and optical disks (e.g., compact discs (CDs) and digital versatile discs (DVDs)). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), or a touchscreen, by which the user can provide input to the computer. Other kinds of devices (e.g., a smart phone, a tablet PC, to name a few) can be used to provide for interaction with a user as well. For example, feedback provided to the user can be any form of sensory feedback, (e.g., visual feedback, auditory feedback, or tactile feedback, to name a few), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

While the invention has been described in conjunction with exemplary embodiments outlined above and illustrated in the drawings, it is evident that the principles of the present invention may be implemented using any number of techniques, whether currently known or not, and many alternatives, modifications and variations in form and detail will be apparent to those skilled in the art. Modifications, additions, or omissions may be made to the systems, apparatuses, and methods described herein without departing from the scope of the present invention. Furthermore, while the foregoing describes a number of separate embodiments of the methodology and tools of the present invention, what has been described herein is merely illustrative of the application of the principles of the present invention. For example, the appearance, the features, the inputs and outputs and the mathematical algorithms of components described herein can be varied to suit a particular application. In addition, each of the various embodiments described above may be combined with other described embodiments in order to provide multiple features. Furthermore, the operations of the systems and apparatuses disclosed herein may be performed by more, fewer, or other components and the methods described may include more, fewer, or other steps. Additionally, steps may be performed in any suitable order.

Accordingly, the exemplary embodiments of the invention, as set forth above, are intended to be illustrative, not limiting, and the spirit and scope of the present invention is to be construed broadly and limited only by the appended claims, and not by the foregoing specification.

To the extent certain functionality or components "can" or "may" be performed or included, respectively, the identified functionality or components are not necessarily required in all embodiments, and can be omitted from certain embodiments of the invention.

To the extent that the foregoing description refers to the "invention" or "present invention," the present disclosure may include more than one invention.

APPENDIX: MATHEMATICAL TERMS AND NOTATIONS

Matrix M has k rows and n columns.

Dimensions are optionally tracked for each matrix in square brackets following the matrix symbol: $M=M[k,n]$ Element of a Matrix is denoted with round brackets:

$$M(i,j)$$

$$M[k,n](i,j)$$

$$0[k,n]1[k,n]2[k,n]3.14[k,n]$$

Rows and Columns of a Matrix are denoted with round brackets with a single index, Orientation (row, column) is revealed from context:

$M(i)=M(i)[1,n]$ is a row $M(j)=M(j)[k,1]$ is a column

Vector is a matrix with one row or one column:

$V[1,n]$ is a row vector $V[k,1]$ is a column vector

Element of a Vector is denoted with round brackets:

$$V(i)$$

$$V[1,n](i)$$

$$V[k,1](i)$$

$$M(i,j)=M(i)[1,n](j)=M(j)[k,1](i)$$

Transposing a matrix or a vector changes its dimensions in place:

$$M[k,n] \Rightarrow M^T[n,k]$$

$$V[1,n] \Rightarrow V^T[n,1]$$

Scalar Broadcasting fills a matrix with all elements equal to the same number:

$$0[k,n]$$

$$1[k,n]$$

$$2[k,n]$$

$$3.14[k,n]$$

etc.

Sum of two or more matrices happens element-wise and requires all dimensions of the matrices to be the same:

$$A[x,y]+B[x,y]=C[x,y]$$

For More than Two Matrices:

$$M[k,n] = \sum_i M_i[k,n]$$

Multiplication (Hadamard Product) of two or more matrices happens element-wise and requires all dimensions of the matrices to be the same:

$$A[x,y] \times B[x,y]=C[x,y]$$

For More than Two Matrices:

$$M[k, n] = \prod_i M_i[k, n]$$

Multiplication of a matrix and a vector happens element-wise across all rows or columns, depending on which dimension is matching:

$A[x,y] \times B[1,y] = C[x,y] \Rightarrow$ row-wise multiplication $A[x,y] \times B[x,1] = C[x,y] \Rightarrow$ column-wise multiplication Multiplication of a matrix and a scalar happens element-wise across all elements of the matrix:

$\sigma M[k,n] = \sigma * M[k,n] = \sigma[k,1] \times M[k,n] = \sigma[1,n] \times M[k,n] = \sigma[k,n] \times M[k,n]$, where $\sigma$ is a scalar Dot-Product of two vectors is a scalar:

$A[1,x] \cdot B[x,1] = \sigma[1,1] = \sigma$

Matrix Dot-Product is the traditional matrix multiplication and requires inner dimensions to be the same:

$A[x,y] \cdot B[y,z] = C[x,z]$

Concatenation of two matrices requires one of their dimensions to be the same:

$A[x,z] \cup B[y,z] = C[x+y,z]$ or $A[x,y] \cup B[x,z] = C[x,y+z]$ or, for multiple matrices:

$$M\left[\sum_i k_i, n\right] = \bigcup_i M_i[k_i, n] \Rightarrow \text{stack vertically}$$

$$M\left[k, \sum_i n_i\right] = \bigcup_i M_i[k, n_i] \Rightarrow \text{arrange horizontally}$$

Decomposition:
A matrix can be decomposed into its row or column vectors, concatenation of which gives back the original matrix:

$$M[k, n] = \bigcup_{i=1}^{k} M_i[1, n]$$

$$M[k, n] = \bigcup_{i=1}^{n} M_i[k, 1]$$

Identity Matrix is a diagonal matrix:

$$\mathbb{I}[k, n] = \bigcup_{i=1}^{k} \bigcup_{j=1}^{n} \begin{cases} 1, & i = j \\ 0, & i \neq j \end{cases}$$

Linearized Outer Product of two vectors is a vector obtained by concatenating their element products along the same axis:

$$(A[1, x] \otimes B[1, y])[1, x*y] = \bigcup_{i=1}^{x} \bigcup_{j=1}^{y} A(i) * B(j)$$

$$(A[x, 1] \otimes B[y, 1])[x*y, 1] = \bigcup_{j=1}^{y} \bigcup_{i=1}^{x} A(i) * B(j)$$

Left Join of matrix A to matrix B on a column j consists of creating a new matrix A×B with all columns from A and from B, where columns borrowed from B in those rows where A(i,j)=B(i,j) have the values from B, and zero in the rest of the rows:

$A[a, b] \bowtie_j B[c, d] = C[a, b+d-1]$:

$$\begin{cases} C(i, b+\ldots) = B(i, x) \forall i: \exists B(i, j): A(i, j) = B(i, j), x \neq j \\ C(i, b+\ldots) = 0.0 \forall i: \nexists B(i, j): A(i, j) = B(i, j) \end{cases}$$

Element-wise application of a function consists of applying scalar-valued function to every element of a matrix:

scalar_function$(A)[x,y] = B[x,y]$

Row-wise and column-wise application of a function consists of decomposition of a matrix into row or column vectors followed by application of a function to each row or column to obtain a resulting vector followed by concatenation:

$$M[k, x] = \bigcup_{i=1}^{k} \text{vector\_function}(M_i[1, n])[1, x]$$

$$M[h, n] = \bigcup_{i=1}^{n} \text{vector\_function}(M_i[k, 1])[y, 1]$$

Folding of a matrix is a row-wise or column-wise sum:

$$M[1, n] = \sum_k M[k, n]$$

$$M[k, 1] = \sum_n M[k, n]$$

Ranking Function of a vector V[k,1] is a mapping function $\Im(V[k,1], \text{ORDER})$ into a vector of positions (also known as indices) I[k, 1], such that $\tilde{V}[k, 1]$ represents the original vector V[k, 1] with elements reordered in accordance with the ORDER specification (e.g., ascending (ASC), descending (DESC), etc.):

$$\tilde{V}[k, 1] = \bigcup_{i=1}^{k} V(I(i))$$

An example of Ranking Function is simple indexed_sort, where I[k,1] is the indices of elements of V[k, 1] in the order of magnitude.

Hierarchical Ranking Function of a vector V[k, 1], is a special case of a Ranking Function with an additional parameter M[b, k], a matrix of one-hot encoded block membership:

$$\Im(V[k,1], M[b,k], \text{ORDER}) = I[k,1]$$

Using V[k, 1] and M[b, k], it is possible to define two additional parameters:
a vector B[b, 1]=M[b, k]·V[k, 1] of block scores, and
a vector M'[k, 1]=$U_{i=1}^{b}$ index_of_nozero($M_i^T$[k,1]) of block assignments. Each block assignment assigns a position 1 . . . k within V[k, 1] to a block 1 . . . b.

The hierarchical aspect of the ranking function takes into account two scores for each position i∈[1, k]: the original score V(i), and the block score B(M'(i)) for the block M'(i) assigned to the position i in the block assignment vector.

An example of Hierarchical Ranking Function is simple hierarchical_indexed_sort (hi_sort), where I[k,1] is the indices of elements of V[k, 1] in the order of magnitude of their block scores tie-broken by the order of magnitude of their element scores.

Block-Average Encoding:
Consider one-hot encoded vector V[k, 1]. One-hot encoding means that, if this vector describes an instance, then:

$$V(i) = \begin{cases} 1.0, \text{ if the instance has property } i \\ 0.0, \text{ if the instance does not have property } i \end{cases}$$

Considering the vector of block assignments M'[k, 1] defined above, block-average encoding for vector V[k, 1] can be obtained from one-hot encoding by dividing each element of V[k, 1] by the sum of all elements of V[k, 1] belonging to the same group:

$$(V|M)[k,1] = \bigcup_{i=1}^{k} \frac{V(i)}{\sum_{j: M'(j)=M'(i)} V(j)}$$

Block-average-encoded vectors and matrices are marked herein with a pipe symbol followed by the corresponding one-hot block assignment matrix name.

Vector Normalization consists of transforming a vector into another vector with length 1.0 with respect to some norm (e.g., a measure of vector lengths). A norm is a function mapping a vector into a scalar:

$$\|V[k,1]\| = N[1,1]$$

Normalized vectors are marked with a hat symbol:

$$\hat{V}[k,1] \Rightarrow \|\hat{V}\| = 1.0$$

Vector normalization usually preserves the direction of a vector. L1- and L2-norms are used most often and they do preserve the direction of a vector. To standardize normalization algorithms, any L-norm can be used. In general, L1-norm (Manhattan distance), or L2-norm (Euclidean distance) may be sufficient.

For purposes of at least one embodiment of the present invention, it may not be necessary to preserve the direction of a vector, but normalization may be required to maintain the relative order of the vector's elements with respect to their magnitude (a weaker constraint):

$$\text{indexed\_sort}(V) = \text{indexed\_sort}(\hat{V})$$

So a "relaxed" definition of a normalized vector can be provided as follows: "normalized vector is a vector with a given L-norm equal to 1.0, such that the relative magnitudes of vector elements correspond to the relative magnitudes of the original vector elements." Such normalized vectors are marked with a hat symbol:

$$\hat{V}[k,1] \Rightarrow \begin{cases} \|V[k,1]\|_L = 1.0 \\ \text{indexed\_sort}(V) = \text{indexed\_sort}(\hat{V}) \end{cases}$$

Many functions may fit this definition, such as $$\hat{V}[k,1] = \frac{V[k,1]}{\sum_{i=1}^{k} \text{abs}(V(i))} \text{ (only if } L1\text{-}norm \text{ is selected)}$$

$$\hat{V}[k,1] = \frac{V[k,1]}{\sqrt[2]{\sum_{i=1}^{k}(V(i))^2}} \text{ (only if } L2\text{-}norm \text{ is selected)}$$

$$\hat{V}[k,1] = \bigcup_{i=1}^{k} \frac{e^{V(i)}}{\sum_{j=1}^{k} e^{V(j)}} \text{ (i.e. sigmoid aka } \textit{softmax},$$

only if L1-norm is selected)

Matrix Normalization consists of normalizing rows or columns of a matrix. To distinguish row versus column normalization, the normalized dimension is marked with a hat symbol as well:

$$\hat{A}[\hat{x},y] = \bigcup_{i=1}^{x} \hat{A}_i[1,y] \Rightarrow L\text{-norm of each row is } 1.0$$

$$\hat{A}[x,\hat{y}] = \bigcup_{i=1}^{y} \hat{A}_i[x,1] \Rightarrow L\text{-norm of each column is } 1.0$$

What is claimed is:

1. A computer implemented method comprising the steps of:
    (a) receiving, at a computer system comprising one or more computers, a search query containing a search phrase from a user device;
    (b) executing, by the computer system, a query on a search index database to identify matches in response to the search query;
    (c) computing, by the computer system, facet counts associated with the matches;
    (d) ranking, by the computer system, the matches;
    (e) selecting, by the computer system, top K of the matches, wherein K is a predetermined number;
    (f) receiving, at the computer system from a plurality of recommendation systems, a plurality of recommendation signals generated by the plurality of recommendation systems based at least in part on the search phrase, a customer record, the top K of the matches, and the facet counts;
    (g) calculating, by the computer system, recommendation scores based at least in part on a combination of the plurality of recommendation signals from the plurality of recommendation systems in accordance with a scoring function S[p, 1]:

$$S[p,1] = B_\in[p,1] \times ((P|M)_\in[p,n] \cdot U[n,r_a] \cdot \vec{W_a}[\vec{r_a}1]),$$

wherein B[p,1]=$\hat{Q}[p,\hat{r}_p] \cdot \hat{\mathcal{W}}_{\hat{r}_p}[\hat{r}_p,1]$ is a multiplicative boost vector,
U[n,$r_a$]=((R $\overleftrightarrow{\times L}$)|M)$_\in$[n,$\vec{r_a}$]×L[n,1] is an adjusted attribute value recommendation matrix, L is whitelisting and blacklisting of attributes and attribute values, P is a product matrix P[p, n] of p products, each product having a total of n possible one-hot encoded attribute values, M is a matrix M[a, n] of one-hot encoded attribute-value to attribute assignments, Q is a first recommendation signal Q[q, $r_p$] from $r_p$ product recommenders, R is a second recommendation signal R [n, $r_a$] from $r_a$ attribute- and attribute-value recommenders, $W_p$ is a vector $W_p[r_p, 1]$ of product recommender weights, $W_a$ is a vector $W_a[r_a, 1]$ of attribute- and attribute-value recommender weights, and the recommendation signals comprise the first recommendation signal Q[q, $r_p$] and the second recommendation signal R [n, $r_a$];

(h) determining, by the computer system, an order of the top K of the matches based at least in part on the recommendation scores;

(i) determining, by the computer system, an order of facets and facet values based at least in part on the recommendation scores;

(j) generating, by the computer system, a search result comprising the ordered top K of the matches and the ordered facets and facet values; and (k) providing, by the computer system, the search result to the user device.

2. The computer implemented method of claim 1, further comprising, after the step (g) and before the step (h), the step of selecting at most k from the top K of the matches that contribute at least s % of a total of the recommendation scores, wherein the s % is a predetermined percentage of the total of the recommendation scores and k≤K.

3. The computer implemented method of claim 1, further comprising, after the step (g) and before the step (i), the step of selecting facet values that contribute at least a predetermined percentage of the total of the recommendation scores per facet.

4. The computer implemented method of claim 1, wherein the step (g) of calculating recommendation scores comprises approximating, by the computer system using a machine learning model, a quadratic function $S[p, 1]=(\phi[p, r]\cdot W_p[r, 1])\times(\phi[p, r]\cdot W_a[r, 1])$ to learn the product recommender weights $W_p$ and the attribute- and attribute-value recommender weights $W_a$ based at least in part on key-performance-indicator driving feedback signals, wherein:

$$\phi_p[p,r_p]=\hat{Q}_\in[p,\hat{r}_p];$$

$$\phi_{a1}[p,r_a]=(P|M)_\in[p,n]\cdot U[n,r_a];$$

$$\phi[p,r]=\phi_p[p,r_p]\cup\phi_{a1}[p,r_a], \text{ where } r=r_p+r_a; \text{ and}$$

a log associated with a matrix of product features φ is used as an input into training of the machine learning model.

5. The computer implemented method of claim 1, wherein the step (g) of calculating recommendation scores comprises directly approximating, by the computer system using a first machine learning model, product feature weights W[r̃, 1] wherein:

$$S(\phi)[p,1]=\Phi[p,\tilde{r}]\cdot W[\tilde{r},1];$$

$$W[\tilde{r},1]=(\Phi^T[\tilde{r},p_d]\cdot\Phi[p_d,\tilde{r}]+\alpha I[\tilde{r},\tilde{r}])^{-1}\cdot\Phi^T[\tilde{r},p_d]\cdot S[p_d,1];$$

r̃ is a number of transformed features from r input features; and transformed features Φ[p, r̃] of a log associated with φ[p, r] are used as input into training of the first machine learning model.

6. The computer implemented method of claim 5, wherein the transformed features Φ[p, r̃] are obtained by:

$$\bigcup_{k=1}^{p} \phi(k) \otimes \phi(k).$$

7. The computer implemented method of claim 5, wherein the first machine learning model comprises a pointwise training discipline using a linear model.

8. The computer implemented method of claim 1, wherein the step (g) of calculating recommendation scores comprises approximating, by the computer system using a first machine learning model, a linear function $\mathcal{F}_{a2}$ to learn attribute-and-attribute value weights $W_a$ wherein:

$$\mathcal{F}_{a2}(P,M,R,W_a)[n,1]=U[n,r_a]\cdot W_a[\hat{r}_a,1]$$

$$\phi_{a2}[n,r_a]=U[n,r_a]; \text{ and}$$

a log associated with $\phi_{a2}$ is used as an input into training of the first machine learning model.

9. The computer implemented method of claim 8, wherein the first machine learning model comprises a pointwise training discipline using a linear model.

10. The computer implemented method of claim 8, wherein the step (g) of calculating recommendation scores further comprises approximating, by the computer system using a second machine learning model, a feature transformation function $$\Phi[p,r_p]=\phi[p,r_p]\times((P|M)_\in[p,n]\cdot\mathcal{F}_{a2}(\phi_{a2}[p,r_a])[n,1])$$

to learn the product recommender weights $W_p$, wherein:

$$S[p,1]=\Phi[p,r_p]\cdot W_p[r_p,1]; \text{ and}$$

$$\phi_p[p,r_p]=\hat{Q}_\in[p,\hat{r}_p].$$

11. The computer implemented method of claim 10, wherein the second machine learning model comprises a pointwise training discipline using a linear model.

12. The computer implemented method of claim 1, wherein the step (g) of calculating recommendation scores comprises computing, by the computer system, a vector of attribute value scores V[n, 1] in accordance with:

$$V[n,1]=U[n,r_a]\cdot W_a[\hat{r}_a,1].$$

13. The computer implemented method of claim 12, wherein the step (g) of calculating recommendation scores further comprises computing, by the computer system, attribute scores $\mathcal{A}$ (V) by summing each block in accordance with:

$$\mathcal{A}(V)=A[a,1]=M[a,n]\cdot V[n,1].$$

14. The computer implemented method of claim 12, wherein the step (i) of determining an order of facets and facet values comprises generating, by the computer system, a vector of cumulative attribute value ranks I[n, 1] in accordance with:

$$I[n,1]=\text{hi\_sort}\left(V[n,1]\times\sum_p((P|M)_\in[p,n]\times B_\in[p,1])^T[n,p], M[a,n], DESC\right).$$

15. The computer implemented method of claim 12, wherein the step (i) of determining an order of facets and facet values comprises generating, by the computer system, a vector of discriminative attribute value ranks I[n, 1] in accordance with:

$$I[n,1] = \text{hi\_sort}(V[n,1] \times (1+\varepsilon - \Delta G^T)[n,1], M[a,n], \text{DESC}),$$

wherein ε[n, 1] is a vector having a very small value for each element to facilitate a tie-break, $$(G_1[1, n] - G_2[1, n]) \cdot V[n, 1] =$$

$$\Delta G[1, n] \cdot V[n, 1] = \sum_{i=1}^{n}(G_1(i) - G_2(i)) * V(i),$$

$$G_1[1, n] = \left(\sum_{P_1} \mathcal{F}_{P_1}[p_1, 1]\right)[1, 1] \times \left(\sum_{P_1} (P \mid M)_{\epsilon_1}[p_1, n]\right)[1, n]$$

$$G_2[1, n] = \left(\sum_{P_2} \mathcal{F}_{P_2}[p_2, 1]\right)[1, 1] \times \left(\sum_{P_2} (P \mid M)_{\epsilon_2}[p_2, n]\right)[1, n]$$

$$\Delta G[1, n] =$$

$$\left(\sum_{P_1} B_\epsilon\right)[1, 1] \times \left(\sum_{P_1}(P \mid M)_\epsilon\right)[1, n] - \left(\sum_{P_2} B_\epsilon\right)[1, 1] \times \left(\sum_{P_2}(P \mid M)_\epsilon\right)[1, n]$$

and wherein $G_1$ and $G_2$ are group vectors for a first group of products $p_1$ and a second group of products $p_2$, respectively, the first group of products $p_1$ and the second group of products $p_2$ being selected from the p products based on their recommendation scores in S[p, 1].

16. A computer system comprising:
one or more memories comprising a search index database;
one or more processors operatively connected to the one or more memories; and
one or more computer readable media operatively connected to the one or more processors and having stored thereon computer instructions for carrying out the steps of:
(a) receiving, at the computer system, a search query containing a search phrase from a user device;
(b) executing, by the computer system, a query on a search index database to identify matches in response to the search query;
(c) computing, by the computer system, facet counts associated with the matches;
(d) ranking, by the computer system, the matches;
(e) selecting, by the computer system, top K of the matches, wherein K is a predetermined number;
(f) receiving, at the computer system from a plurality of recommendation systems, a plurality of recommendation signals generated by the plurality of recommendation systems based at least in part on the search phrase, a customer record, the top K of the matches, and the facet counts;
(g) calculating, by the computer system, recommendation scores based at least in part on a combination of the plurality of recommendation signals from the plurality of recommendation systems in accordance with a scoring function S[p, 1]:

$$S[p,1] = B_\epsilon[p,1] \times ((P|M)_\epsilon[p,n] \cdot U[n,r_a] \cdot W_a[\tilde{r}_a, 1]),$$

wherein $B[p,1] = \hat{Q}[p, \tilde{r}_p] \cdot W_r[\tilde{r}_p, 1]$ is a multiplicative boost vector,
$U[n,r_a] = ((R \times L)|M)_\epsilon[n, \tilde{r}_a] \times L[n,1]$ is an adjusted attribute value recommendation matrix, L is whitelisting and blacklisting of attributes and attribute values, P is a product matrix P[p, n] of p products, each product having a total of n possible one-hot encoded attribute values, M is a matrix M[a, n] of one-hot encoded attribute-value to attribute assignments, Q is a first recommendation signal Q[q, $r_p$] from $r_p$ product recommenders, R is a second recommendation signal R[n, $r_a$] from $r_a$ attribute- and attribute-value recommenders, $W_p$ is a vector $W_p[r_p, 1]$ of product recommender weights, $W_a$ is a vector $W_a[r_a, 1]$ of attribute- and attribute-value recommender weights, and the recommendation signals comprise the first recommendation signal Q[q, $r_p$] and the second recommendation signal R[n,$r_a$];
(h) determining, by the computer system, an order of the top K of the matches based at least in part on the recommendation scores;
(i) determining, by the computer system, an order of facets and facet values based at least in part on the recommendation scores;
(j) generating, by the computer system, a search result comprising the ordered top K of the matches and the ordered facets and facet values; and
(k) providing, by the computer system, the search result to the user device.

17. The computer system of claim 16, wherein the computer instructions further carry out, after the step (g) and before the step (h), the step of selecting at most k from the top K of the matches that contribute at least s % of a total of the recommendation scores, wherein the s % is a predetermined percentage of the total of the recommendation scores and k≤K.

18. The computer system of claim 16, wherein the computer instructions further carry out, after the step (g) and before the step (i), the step of selecting facet values that contribute at least a predetermined percentage of the total of the recommendation scores per facet.

19. The computer system of claim 16, wherein the step (g) of calculating recommendation scores comprises approximating, by the computer system using a machine learning model, a non-quadratic function $S[p, 1] = (\phi[p, r] \cdot W_p[r, 1]) \times (\phi[p, r] \cdot W_a[r, 1])$ to learn the product recommender weights $W_p$ and the attribute- and attribute-value recommender weights $W_a$ based at least in part on key-performance-indicator driving feedback signals, wherein:

$$\phi_p[p,r_p] = \hat{Q}_\epsilon[p, \tilde{r}_p];$$

$$\phi_{a1}[p,r_a] = (P|M)_\epsilon[p,n] \cdot U[n,r_a];$$

$$\phi[p,r] = \phi_p[p,r_p] \cup \phi_{a1}[p,r_a], \text{ where } r = r_p + r_a; \text{ and}$$

a log associated with a matrix of product features φ is used as an input into training of the machine learning model.

20. The computer system of claim 16, wherein the step (g) of calculating recommendation scores comprises directly approximating, by the computer system using a first machine learning model, product feature weights $\mathcal{W}[\tilde{r}, 1]$ wherein:

$$S(\phi)[p,1] = \Phi[p,\tilde{r}] \cdot \mathcal{W}[\tilde{r},1];$$

$$\mathcal{W}[\tilde{r},1] = (\Phi^T[\tilde{r},p_t] \cdot \Phi[p_t,\tilde{r}] + \alpha I[\tilde{r},\tilde{r}])^{-1} \cdot \Phi^T[\tilde{r},p_t] \cdot S[p_t,1];$$

$\tilde{r}$ is a number of transformed features from r input features; and
transformed features $\Phi[p, \tilde{r}]$ of a log associated with φ[p,r] are used as input into training of the first machine learning model.

21. The computer system of claim 20, wherein the transformed features $\Phi[p, \tilde{r}]$ are obtained by:

$$\bigcup_{k=1}^{p} \phi(k) \otimes \phi(k).$$

22. The computer system of claim 20, wherein the first machine learning model comprises a pointwise training discipline using a linear model.

23. The computer system of claim 16, wherein the step (g) of calculating recommendation scores comprises approximating, by the computer system using a first machine learning model, a linear function $\mathcal{F}_{a2}$ to learn attribute-and-attribute value weights $W_a$ wherein:

$$\mathcal{F}_{a2}(P,M,R,W_a)[n,1]=U[n,r_a]\cdot W_a[\tilde{r}_a,1]$$

$$\phi_{a2}[n,r_a]=U[n,r_a]; \text{ and}$$

a log associated with $\phi_{a2}$ is used as an input into training of the first machine learning model.

24. The computer system of claim 23, wherein the first machine learning model comprises a pointwise training discipline using a linear model.

25. The computer system of claim 23, wherein the step (g) of calculating recommendation scores further comprises approximating, by the computer system using a second machine learning model, a feature transformation function $$\Phi[p,r_p]=\phi_p[p,r_p]\times((P|M)_\in[p,n]\cdot \mathcal{F}_{a2}(\phi_{a2}[p,r_a])[n,1])$$

to learn the product recommender weights $W_p$, wherein:

$$S[p,1]=\Phi[p,r_p]\cdot W_p[r_p,1]; \text{ and}$$

$$\phi_p[p,r_p]=\hat{Q}_\in[p,\tilde{r}_p].$$

26. The computer system of claim 25, wherein the second machine learning model is a pointwise training discipline using a linear model.

27. The computer system of claim 16, wherein the step (g) of calculating recommendation scores comprises computing, by the computer system, a vector of attribute value scores $V[n, 1]$ in accordance with:

$$V[n,1]=U[n,r_a]\cdot W_a[\tilde{r}_a,1].$$

28. The computer system of claim 27, wherein the step (g) of calculating recommendation scores further comprises computing, by the computer system, attribute scores $\mathcal{A}(V)$ by summing each block in accordance with:

$$\mathcal{F}(V)=A[a,1]=M[a,n]\cdot V[n,1].$$

29. The computer system of claim 27, wherein the step (i) of determining an order of facets and facet values comprises generating, by the computer system, a vector of cumulative attribute value ranks $I[n, 1]$ in accordance with:

$$I[n, 1] = \text{hi\_sort}\left(V[n, 1]\times \sum_p ((P\mid M)_\epsilon[p, n]\times B_\epsilon[p, 1])^T[n, p], M[a, n], DESC\right).$$

30. The computer system of claim 27, wherein the step (i) of determining an order of facets and facet values comprises generating, by the computer system, a vector of discriminative attribute value ranks $I[n, 1]$ in accordance with:

$$I[n,1]=\text{hi\_sort}(V[n,1]\times(1+\varepsilon-\Delta G^T)[n,1],M[a,n], DESC),$$

wherein $\varepsilon[n, 1]$ is a vector having a very small value $\varepsilon$ for each element to facilitate a tie-break, $$(G_1[1, n] - G_2[1, n])\cdot V[n, 1] =$$

$$\Delta G[1, n]\cdot V[n, 1] = \sum_{i=1}^{n}(G_1(i) - G_2(i))*V(i),$$

$$G_1[1, n] = \left(\sum_{p_1}\mathcal{F}_{p_1}[p_1, 1]\right)[1, 1]\times \left(\sum_{p_1}(P\mid M)_{\epsilon_1}[p_1, n]\right)[1, n]$$

$$G_2[1, n] = \left(\sum_{p_2}\mathcal{F}_{p_2}[p_2, 1]\right)[1, 1]\times \left(\sum_{p_2}(P\mid M)_{\epsilon_2}[p_2, n]\right)[1, n]$$

$$\Delta G[1, n] =$$

$$\left(\sum_{p_1}B_\epsilon\right)[1, 1]\times \left(\sum_{p_1}(P\mid M)_\epsilon\right)[1, n] - \left(\sum_{p_2}B_\epsilon\right)[1, 1]\times \left(\sum_{p_2}(P\mid M)_\epsilon\right)[1, n]$$

and wherein $G_1$ and $G_2$ are group vectors for a first group of products $p_1$ and a second group of products $p_2$, respectively, the first group of products $p_1$ and the second group of products $p_2$ being selected from the p products based on their recommendation scores in $S[p, 1]$.

* * * * *